(12) United States Patent
Ouammi et al.

(10) Patent No.: US 11,947,325 B2
(45) Date of Patent: Apr. 2, 2024

(54) CONTROLLER FOR MICROGRID POWERED INTERCONNECTED GREENHOUSES

(71) Applicant: QATAR UNIVERSITY, Doha (QA)

(72) Inventors: Ahmed Ouammi, Doha (QA); Ehsan Rezaei, Montréal (CA); Hanane Dagdougui, Montréal (CA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/996,626

(22) Filed: Aug. 18, 2020

(65) Prior Publication Data
US 2022/0057764 A1 Feb. 24, 2022

(51) Int. Cl.
*G05B 19/042* (2006.01)
*F24F 130/10* (2018.01)
*F24F 130/20* (2018.01)
*F24F 140/00* (2018.01)

(52) U.S. Cl.
CPC ........ *G05B 19/042* (2013.01); *F24F 2130/10* (2018.01); *F24F 2130/20* (2018.01); *F24F 2140/00* (2018.01); *G05B 2219/2614* (2013.01)

(58) Field of Classification Search
CPC .......... G05B 19/042; G05B 2219/2614; F24F 2130/20; F24F 2140/00; F24F 2130/10
USPC ...................................................... 700/276
See application file for complete search history.

(56) References Cited

U.S. PATENT DOCUMENTS

| | | | |
|---|---|---|---|
| 2010/0038440 A1* | 2/2010 | Ersavas | G05D 7/0617 236/51 |
| 2017/0013810 A1* | 1/2017 | Grabell | A01K 63/00 |
| 2018/0023574 A1* | 1/2018 | Stiles, Jr. | F04B 49/22 417/42 |
| 2018/0206422 A1* | 7/2018 | Vandecruys | A01G 7/02 |

(Continued)

FOREIGN PATENT DOCUMENTS

| | | | | |
|---|---|---|---|---|
| CN | 111108969 A | * | 5/2020 | ............... A01G 7/04 |
| EP | 3 604 957 A1 | | 2/2020 | |

(Continued)

OTHER PUBLICATIONS

Chen et al. (Wei-Han Chen and Fengqi You, Efficient Greenhouse Temperature Control with Data-Driven Robust Model Predictive, pp. 1986-1991, 2020 American Control Conference Denver, CO, USA, Jul. 1-3, 2020, Date Added to IEEE Xplore: Jul. 27, 2020, DOI: 10.23919/ACC45564.2020.9147701) (Year: 2020).*

(Continued)

*Primary Examiner* — Michael W Choi
(74) *Attorney, Agent, or Firm* — SQUIRE PATTON BOGGS (US) LLP

(57) ABSTRACT

A method for controlling an environmental system may include defining a reference signal of an environmental variable in a greenhouse. The method may also include receiving renewable resource information related to the greenhouse. The method may further include receiving dynamic weather information of an environment external to the greenhouse. In addition, the method may include determining an optimization control scheme based on the reference signal, renewable resource information, and dynamic weather information. Further, the method may include regulating environmental conditions in the greenhouse according to the optimization control scheme.

24 Claims, 23 Drawing Sheets

(56) References Cited

U.S. PATENT DOCUMENTS

| | | |
|---|---|---|
| 2018/0262571 A1 | 9/2018 | Akhtar |
| 2019/0246478 A1* | 8/2019 | Ashdown .............. G06F 30/20 |

FOREIGN PATENT DOCUMENTS

| | | | | |
|---|---|---|---|---|
| KR | 10-1794622 B1 * | 12/2017 | ............ | Y02A 40/25 |
| WO | WO 2020/131825 A2 * | 6/2020 | ............... | A01G 9/14 |

OTHER PUBLICATIONS

Yu et al. (Jinghua Yu et al., A semi-dynamic heat transfer model of hollow block ventilated wall for thermal performance prediction, Energy and Buildings 134 (2017) pp. 285-294, Available online Nov. 2, 2016, http://dx.doi.org/10.1016/j.enbuild.2016.11.001, Elsevier B.V.) (Year: 2016).*

Dietrich et al. (Ralf C. Dietrich et al., A new physical interpretation of plant root capacitance, Journal of Experimental Botany, vol. 63, No. 17, pp. 6149-6159, 2012, doi:10.1093/jxb/ers264, Advance Access publication Oct. 1, 2012) (Year: 2012).*

G. Van Straten et al., "Towards User Accepted Optimal Control of Greenhouse Climate", Computers and Electronics in Agriculture 26 (2000), pp. 221-238, www.elsevier.com/locate/compag, PII: S0168-1699(00)00077-6.

José Boaventura Cunha et al., "Optimal Management of Greenhouse Environments", EFITA 2003 Conference, Jul. 5-9, 2003, Debrecen, Hungary, 6 pages.

J.P. Coelho et al., "Greenhouse Air Temperature Predictive Control Using the Particle Swarm Optimisation Algorithm", Comuputers and Electronics in Agriculture 49 (2005), pp. 330-344, www.elsevier.com/locate/compag, doi: 10.1016/j.compag.2005.08.003.

Armando Ramírez-arias et al., "Improving Efficiency of Greenhouse Heating Systems Using Model Predictive Control", 16th Triennial World Congress, Prague, Czech Republic. (2005).

Andrzej Pawlowski et al., "Pedictive Control with Disturbance Forecasting for Greenhouse Diurnal Temperature Control", Proceedings of the 18th World Congress, The International Federation of Automatic Control, Milano, Italy, Aug. 28-Sep. 2, 2011, 6 pages.

Marco Massano et al., "A Grey-box Model Based on Unscented Kalman Filter to Estimate Thermal Dynamics in Buildings", Ecole Polytechnique De Montreal, 2019, 6 pages.

* cited by examiner

CONTROLLER FOR MICROGRID POWERED INTERCONNECTED GREENHOUSES

FIELD

Some embodiments may generally relate to internal combustion engine emissions control systems. More specifically, certain embodiments may relate to apparatuses, systems, and/or methods for a controller for microgrid powered interconnected greenhouses.

BACKGROUND

In the context of smart grid, transition from traditional to precision and smart agriculture has opened new challenges and perspectives regarding the development of efficient decision making approaches and management tools where the main objective is energy and water savings. In this context, smart greenhouses may be defined as solution to cope with challenges of agriculture development. A smart greenhouse may provide efficient management solutions, new control methods, as well as original decision-support tools. In addition, the smart greenhouse may be considered as a self-regulating climate for an optimal crop development.

Current greenhouse setups experience various challenges. For instance, the modeling and control of the greenhouse climate poses a challenging task given the complexity of a greenhouse microclimate. One challenge is that existing greenhouse climate models are not tailor-made for automatic control, uncertainties, impact of external weather and inner crop growth rate variables, and input saturation that may appear. Efforts have been conducted on the modeling and control of greenhouses, trying to optimize the use of resources while minimizing the effects on the environment. However, commonly existing methods of greenhouse energy management fail to globally optimize the energy use due to lack of integrated frameworks based on multi-inputs and multi-outputs of information.

Furthermore, previous contributions represent limitations from a decision-making viewpoint, and focus on a partial control of the greenhouse operation neglecting the global optimal operation related to the optimal growth conditions, advanced control techniques, and efficient energy management tools. Additionally, previous approaches lack comprehensive control modeling in considering uncertainties and stochastic dynamics of weather data, renewable power production, and indoor environment variables. Thus, there is a need develop an advanced and comprehensive energy management algorithm capable of performing specialized monitoring and control functionalities for a network of smart greenhouses integrated microgrid. There is also a need to use a Grey-box based resistance-capacitance model to obtain a comprehensive modeling and control of the network of greenhouses integrated microgrid while applying real-time features of model predictive control (MPC) in order to handle the forecasting errors related to uncertain variables.

SUMMARY

Certain embodiments may be directed to a method for controlling an environmental system. The method may include defining a reference signal of an environmental variable in a greenhouse. The method may also include receiving renewable resource information related to the greenhouse. The method may further include receiving dynamic weather information of an environment external to the greenhouse. In addition, the method may include determining an optimization control scheme based on the reference signal, renewable resource information, and dynamic weather information. Further, the method may include regulating environmental conditions in the greenhouse according to the optimization control scheme.

Other embodiments may be directed to a controller for regulating environmental systems. The controller may include at least one processor, and at least one memory including computer program code. The at least one memory and the computer program code may be configured to, with the at least one processor, cause the controller at least to define a reference signal of an environmental variable in a greenhouse. The controller may also be caused to receive renewable resource information related to the greenhouse. The controller may further be caused to receive dynamic weather information of an environment external to the greenhouse. Further, the controller may be caused to determine an optimization control scheme based on the reference signal, renewable resource information, and dynamic weather information. In addition, the controller may be caused to regulate environmental conditions in the greenhouse according to the optimization control scheme.

Other embodiments may be directed to a computer program, embodied on a non-transitory computer readable medium. The computer program, when executed by a processor, may cause the processor to define a reference signal of an environmental variable in a greenhouse. The processor may also be caused to receive renewable resource information related to the greenhouse. The processor may further be caused to receive dynamic weather information of an environment external to the greenhouse. Further, the processor may be caused to determine an optimization control scheme based on the reference signal, renewable resource information, and dynamic weather information. In addition, the processor may be caused to regulate environmental conditions in the greenhouse according to the optimization control scheme.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
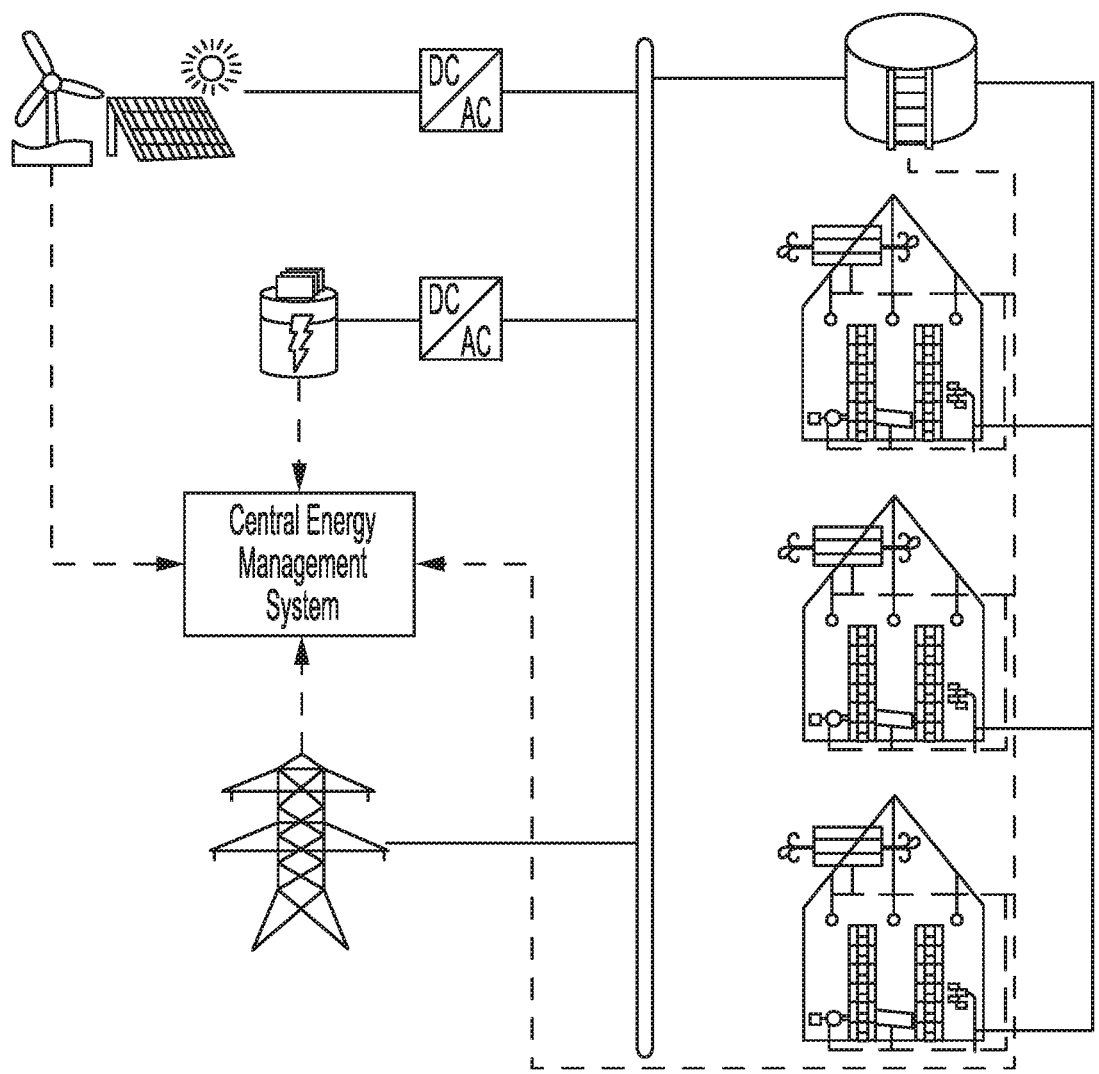
FIG. 1 illustrates an architecture of a network, according to certain embodiments.

It will be readily understood that the components of certain example embodiments, as generally described and illustrated in the figures herein, may be arranged and designed in a wide variety of different configurations. The following is a detailed description of some embodiments for removing smoke from the exhaust of engines such as, for example, diesel engines.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments provide an advanced and comprehensive controller based energy management algorithm and system that are capable of performing specialized monitoring and control functionalities for a network of smart greenhouses integrated microgrid (NSGM). In certain embodiments, the management and monitoring algorithm may include communication-assisted decision-making, prediction, and control modules. The developed controller may be accompanied with a data processing algorithm that analyzes diverse measures provided by sensors to acquire actionable information. According to certain embodiments, the sensors may include $CO_2$ sensors to measure $CO_2$ levels inside and outside. According to other embodiments, the sensors may include a wet sensor to measure soil properties including, for example, water content, electrical conductivity, and temperature. In some embodiments, the sensors may include temperature sensors to measure the inside or outside temperatures. Furthermore, the sensors may include a light sensor to measure an amount of light in the greenhouses, and sensors to measure reservoir water level and energy storage system state. In other embodiments, the sensors may include sensors to measure sun irradiation power and light, and sensors to measure indoor/outdoor humidity. Moreover, the sensors may include sensors to measure outside wind speed, and sensors to measure internal air circulation.

In other embodiments, the algorithm may be embedded in a model predictive control (MPC) scheme to handle forecasting errors related to uncertain variables. Other embodiments may have the ability to schedule the whole network operation while respecting the operational constraints involving appropriate uncertainties, and ensuring a desired microclimate defining the optimal crop development condition in each greenhouse. According to other embodiments, a Grey-box resistance-capacitance (RC) model may be provided to obtain a comprehensive modeling and control of the network while applying real-time features of MPC.

FIG. 1 illustrates an architecture of a network, according to certain embodiments. As illustrated in FIG. 1, the network may include a distribution of renewable energy sources, an energy storage system, a water reservoir, sensors, electric and water loads, communication and metering infrastructure, advanced management and monitoring system, set of greenhouses, and a connection with the main grid allowing power exchanges. According to certain embodiments, each greenhouse may be defined as a microclimate unit for optimal environment of crops development that may include artificial lighting, $CO_2$, a generator, heating/cooling system, fans, local pump, and natural ventilation. In some embodiments, the microgrid may balance the power production and loads in a cooperative and sustainable manner at the network level.

Figure 2:
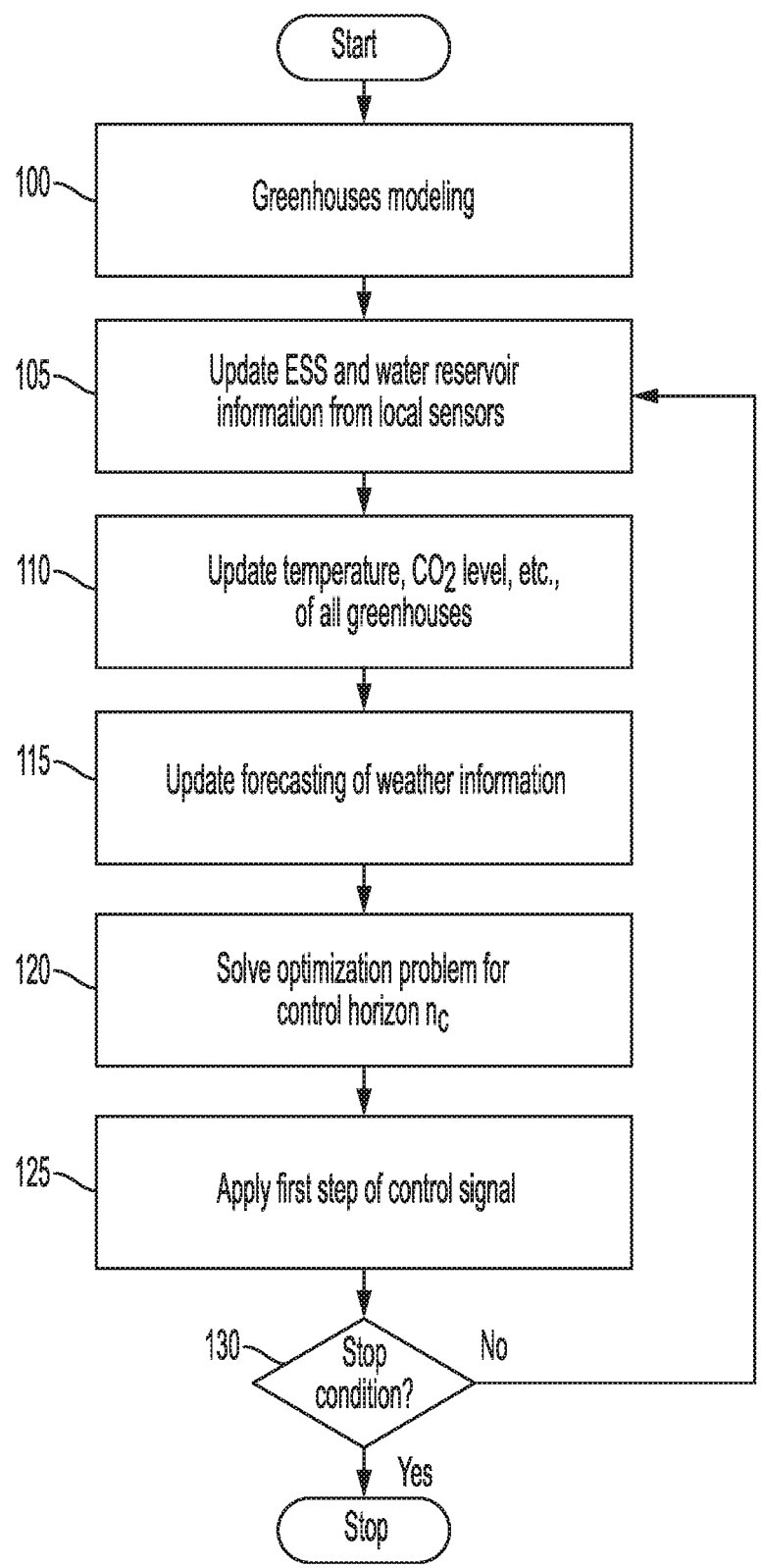
FIG. 2 illustrates a flow diagram of a controller operation, according to certain embodiments.

FIG. 2 illustrates a flow diagram of a controller operation, according to certain embodiments. In certain embodiments, a central controller based Grey-box based RC model may be configured to minimize the total energy consumption of greenhouses, while optionally controlling the microclimate variables defining the optimal crops development at the network level. As illustrated in FIG. 2, at 100, the controller may function to model each greenhouse in a network of greenhouses. At 105, the controller may gather information from an energy storage system, water reservoir, and renewable sources. Further, at 110, the controller may update information of all greenhouses within the network. According to certain embodiments, the information may include, but not limited to, temperature, $CO_2$ level, inside illumination status, information of wet sensors, and/or heating, ventilation, and air conditioning (HVAC) of all the greenhouses. At 115, the controller may update weather predictions. In addition, at 120, the controller may solve a mixedinteger programming (MIP) optimization over a prediction horizon $n_c$. According to certain embodiments, this may correspond to a model predictive control method, which looks ahead in time and based on the system's future behavior. In some embodiments, the method may determine the future optimal operation of a system, and the horizon may correspond to a fixed time interval in the future at which predictions ahead are performed. According to certain embodiments, the prediction horizon may be a variable that is decided by a user or operator.

Further, at 125, the controller may apply a first step of the control signal. For instance, the MPC based optimization problem may be solved for the whole time horizon and at each time step. The MPC may apply the first optimal signal at the current time step, and move to solve the optimization problem at the next time step considering new prediction data. In certain embodiments, the control signals may define the optimal operation of each system at each time step (energy storage systems, renewable generators, pumps, $CO_2$ generators, artificial lightings, HVAC units, fans, and ventilation). At 130, if there is no failure or user cancelation, the function of the controller may return to 105. In certain embodiments, failure may correspond to failure of each system such as lights, $CO_2$ generators, energy storage system (ESS), photo-voltaic (PV) panels, wind turbines, HVACs, fans, sensors, prediction systems, entennet and internet connections etc., and/or failure of the controller. However, if at 130, it is determined that there is failure or user cancelation, the function of the controller may stop.

According to certain embodiments, the controller may include multiple parts. For example, a one part of the controller may include greenhouse modeling. In certain embodiments, the greenhouse modeling may be based on the greenhouse characteristics including but not limited to, for example, area, volume, wall materials, wall area, shape, schematic drawing, air ventilation gates, and type of plant(s). The greenhouse modeling may also be based on a thermal RC model of the greenhouse. According to certain embodiments, some parameters of the model greenhouse may include thermal characteristics of air, walls, and plants, which may be considered as constant values or adaptive values based on user choices. For instance, if the user selects an adaptive option, a parameters estimation method may be applied to find these parameters automatically. In some embodiments, each material may be characterized by its thermal resistance and capacitance. These parameters may also be constant and depend on the material and size.

In certain embodiments, the greenhouse may be modeled by considering various steps. For instance, the modeling of the walls, roof, glass, and heating/cooling system of the greenhouse. According to certain embodiments, the heating/cooling system may be modeled as a current source. According to other embodiments, the thermal conductivity of inside air may be determined based on its humidity and $CO_2$ level, and also the type of crops or plants. According to further embodiments, the air and plants may be modeled with an equivalent RC model. In some embodiments, the outside temperature and solar irradiation may be modeled as voltage and current sources, respectively. In addition, the components of the different elements of the modeled greenhouse may be connected to each other, and describe a network of RC elements.

Figure 3:
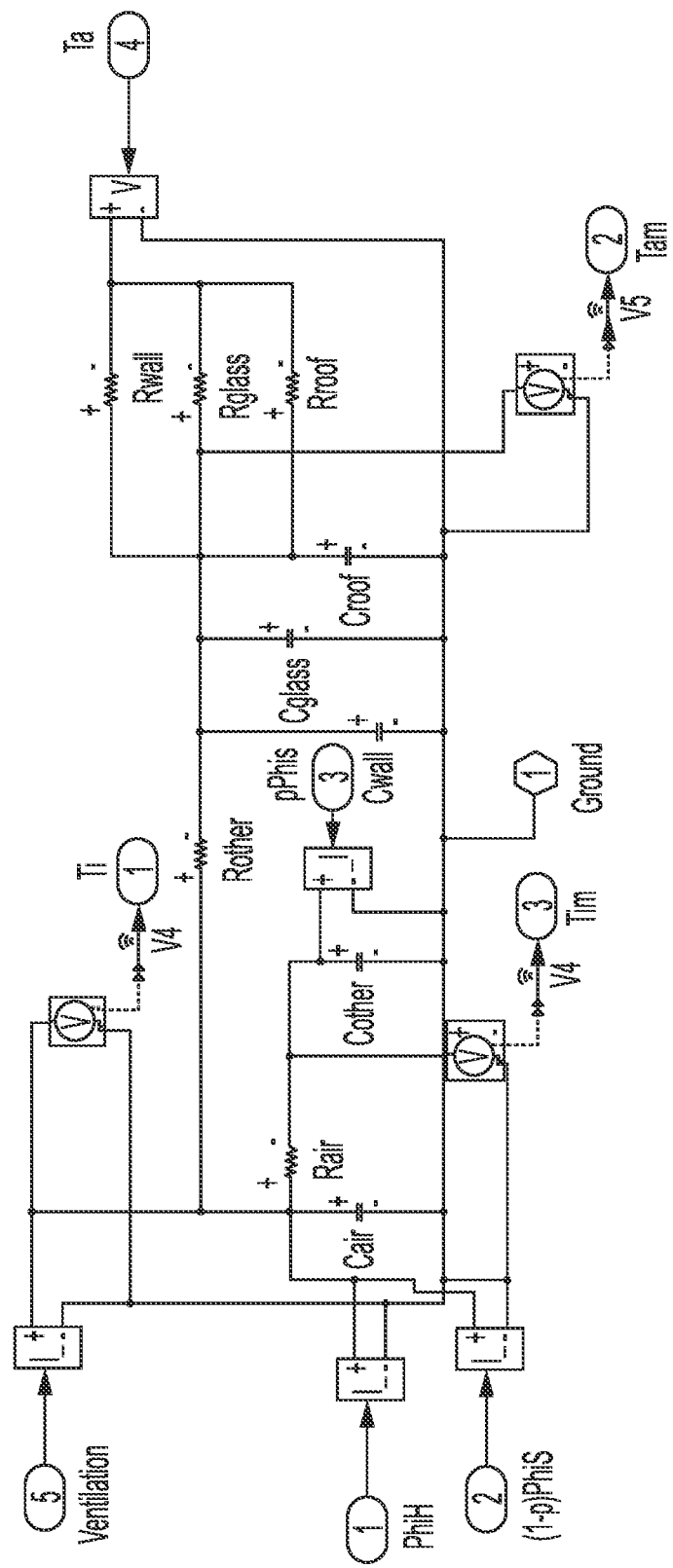
FIG. 3 illustrates a thermal architecture of a greenhouse, according to certain embodiments.

FIG. 3 illustrates a thermal architecture of a greenhouse, according to certain embodiments. As illustrated in FIG. 3, the thermal architecture of the greenhouse may include HVAC system. According to certain embodiments, the greenhouses available in the network may be modelled based on their design and characteristics. As described above, and illustrated in FIG. 3, the air and plants may be modeled as equivalent RC components, and the outside temperature and solar irradiation may be modeled as voltage and current sources, respectively. In addition, FIG. 3 illustrates that the heating/cooling system may be modeled as a current source.

Figure 4:
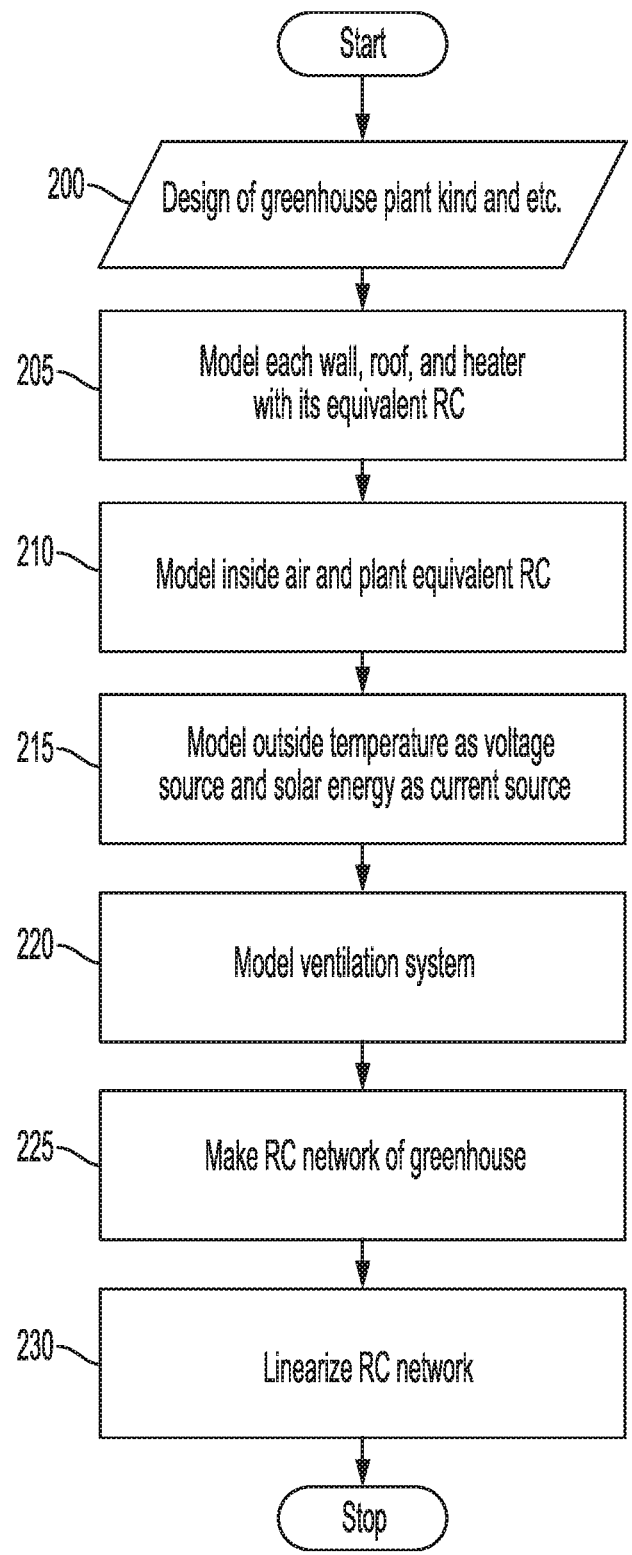
FIG. 4 illustrates a flow diagram of a method for modeling a greenhouse, according to certain embodiments.

FIG. 4 illustrates a flow diagram of a method for modeling a greenhouse, according to certain embodiments. For example, at 200, the modeling method may include designing the greenhouse, plant type(s), and other features of the greenhouse. For instance, other features of the greenhouse may include the materials which are used to build the greenhouse, and their order of how the material is used to build the greenhouse. For example, if there is a multi-layered wall, each layer material type should be known, as well as how they are put together to make the wall. At 205, the modeling method may include modeling each wall, roof, and heater of the greenhouse with its equivalent RC. The modeling method may also include, at 210, modeling the inside air and plant equivalent RC. At 215, the modeling method may include modeling the outside temperature of the greenhouse as a voltage source, and modeling solar energy as a current source. Further, at 220, the modeling method may include modeling the ventilation system of the greenhouse, and at 225, the modeling method may include creating an RC network of a single greenhouse, which may be the same process that is applied for all greenhouses in the network to obtain a complete model of the greenhouse network. At 230, the modelling method may include linearizing the RC network.

According to certain embodiments, another part of the controller may include forecasting updates. In some embodiments, since a model predictive approach may be used, future data of the outside temperature, solar radiation, wind, and plant behavior may be used to obtain better results. Thus, certain embodiments may provide ways to obtain prediction data. One way may include using weather predictions that may be sent to the controller through the Internet, Intranet, or local network. Another way may include using information of local sensors. According to certain embodiments, the online prediction method may include a machine learning technique, and may be performed on the server side. In some embodiments, the local information from the local sensors may be gathered and sent to the server to enhance the predictions. Further, at the local side, a filtering method such as a Kalman filter, may be used to enhance the prediction.

In certain embodiments, another part of the controller may include control features. In some embodiments, the controller may control the indoor microclimate variables of the greenhouse, and regulate the environment variables to create optimal conditions for crop development in the greenhouse. That is, according to certain embodiments, the controller may be configured to track various reference signals defining the optimal growth of each type of crop available in a specific greenhouse. According to certain embodiments, the reference signals may define the optimal condition for crop growth. They may also define the microclimate of each greenhouse including, for example, temperature, $CO_2$ rate, lighting, humidity, water flow, etc. According to other embodiments, the controller may be configured to control all the greenhouses of the network. Each greenhouse may have a specific microclimate depending on the crop. In addition, the controller may be configured to create the desired microclimate in each greenhouse of the network at the same time. As such, certain embodiments may minimize the deviation from desired reference signals. Furthermore, certain embodiments may maximize the use of local renewable energy production for a network of greenhouses. As such, certain embodiments may limit the power exchanges with the main grid at low levels, and the total purchased power from the main grid may be reduced over some prediction horizon.

Modeling of the Network Component

PV Panels

Certain embodiments may provide a modeling of the greenhouse network. For instance, according to certain embodiments, PV panels may be used in the greenhouses of the network. The expected power output of the PV panels, assuming operation at maximum power point (MPP), may be described according to equation (1).

$$P_{pv}[k] = \eta_{MPPT} \times P_{PV,Rated} \times \frac{G[k]}{1000} \quad (1)$$

In equation (1), $P_{pv}$ and G are generated output power of panels and solar irradiation, respectively. $P_{pv, Rated}$ is rated power of the panel at $G_T$=1000 W/m$^2$ and $\eta_{MPPT}$ in equation (1) may be rewritten considering MPC format and the prediction horizon $n_p$ as shown in equation (2).

$$P_{pv}[k, n_p] = \begin{bmatrix} P_{pv}[k+1] \\ P_{pv}[k+2] \\ \vdots \\ P_{pv}[k+n_p-1] \end{bmatrix} \quad (2)$$

Wind Turbine Generator

According to certain embodiments, the expected power output of the wind turbine may be determined according to equation (3).

$$P_{wind}[k] = \begin{cases} 0 & v[k] < v_c \\ P_r\left(\frac{v_c}{v_c - v_r} + \frac{1}{v_r - v_c}v[k]\right) & v_c \leq v[k] \leq v_r \\ P_r & v_r \leq v[k] \leq v_f \\ 0 & v[k] > v_f \end{cases} \quad (3)$$

In equation (3), v and $P_{wind}$ are respectively the wind speed and power generated by the wind turbine. Further, $P_r$ of equation (3) represents the rated power of the turbine. In addition, $v_c$, $v_r$, and $v_f$ are cut-in, rated, and cut-out wind speeds, respectively. The equation may be formulated considering the MPC format shown in equation (4).

$$P_{wind}[k, n_p] = \begin{bmatrix} P_{wind}[k+1] \\ P_{wind}[k+2] \\ \vdots \\ P_{wind}[k+n_p-1] \end{bmatrix} \quad (4)$$

Water Reservoirs and Pumps

According to certain embodiments, the network of greenhouses may include a water reservoir in charge of ensuring water loads for irrigation purposes. The time-varying dynamics of the water reservoir may be described according to equation (5).

$$m[k+1] = m[k] + \left[Q_s[k] - \sum_{i \in \ominus} Q_i[k]\right] \quad (5)$$

In equation (5), m, Qs, and $Q_i$ are respectively the amount of water in the water reservoir at time step k, the water flow entering the reservoir from a water source, and water flow pumped to feed each greenhouse. Further, $\ominus$ is a collection of greenhouses with a total numbers of $\chi$. According to certain embodiments, $\chi = \|\ominus\|$, and may be the cardinal of $\ominus$ which shows the number of elements in $\ominus$. Considering the MPC format, equation (5) may be rewritten as equation (6).

$$\begin{bmatrix} m[k+1] \\ m[k+2] \\ \vdots \\ m[k+n_p-1] \\ \underbrace{}_{m[k,n_p]} \end{bmatrix} = \begin{bmatrix} m[k] \\ m[k+1] \\ \vdots \\ m[k+n_p-2] \end{bmatrix} + \quad (6)$$

$$\begin{bmatrix} Q_s[k] \\ Q_s[k+1] \\ \vdots \\ Q_s[k+n_p-2] \\ \underbrace{}_{q_s[k,n_p]} \end{bmatrix} - \begin{bmatrix} \sum_{i \in \ominus} Q_i[k] \\ \sum_{i \in \ominus} Q_i[k+1] \\ \vdots \\ \sum_{i \in \ominus} Q_i[k+n_p-2] \\ \underbrace{}_{q[k,n_p]} \end{bmatrix} \Rightarrow m[k, n_p] =$$

$$\underbrace{\begin{bmatrix} 1 \\ 1 \\ \vdots \\ 1 \end{bmatrix}}_{A_m} m[k] + \begin{bmatrix} 1 & 0 & \cdots & 0 \\ 1 & 1 & \cdots & 0 \\ \vdots & \vdots & \ddots & \vdots \\ 1 & 1 & \cdots & 1 \end{bmatrix} q[k, n_p] - \begin{bmatrix} 1 & 0 & \cdots & 0 \\ 1 & 1 & \cdots & 0 \\ \vdots & \vdots & \ddots & \vdots \\ 1 & 1 & \cdots & 1 \end{bmatrix} q[k, n_p]$$

According to certain embodiments, the water flow pumped through a local pump in each greenhouse may be expressed as equation (7).

$$Q_i[k] = \eta_i \frac{P_{water,i}[k]}{\rho \cdot g \cdot h_i} \Delta T \quad (7)$$

In equation (7), $P_{water,i}$, $h_i$, and $\eta_i$ are the needed power of pump i, distance of greenhouse i from the reservoir, and efficiency of pump i, and $\Delta T$ is sample time. By defining $P_{water}[k] = [P_{water,1}[k] P_{water,2}[k] \ldots P_{water,\chi}[k]]^T$, equation (8) is obtained.

$$\sum_{i \in \ominus} Q_i[k] = \underbrace{\begin{bmatrix} \eta_1 \frac{\Delta T}{\rho \cdot g \cdot h_1} & \eta_2 \frac{\Delta T}{\rho \cdot g \cdot h_2} & \cdots & \eta_\theta \frac{\Delta T}{\rho \cdot g \cdot h_\chi} \end{bmatrix}}_{\Delta} \quad (8)$$

$$P_{water}[k] = \succ q[k, n_p] = \begin{bmatrix} \Delta & 0 & \cdots & 0 \\ 0 & \Delta & \cdots & 0 \\ \vdots & \vdots & \ddots & \vdots \\ 0 & 0 & \cdots & \Delta \end{bmatrix} \begin{bmatrix} P_{water}[k] \\ P_{water}[k+1] \\ \vdots \\ P_{water}[k+n_p-2] \\ \underbrace{}_{P_{water}[k,n_p]} \end{bmatrix}$$

According to certain embodiments, the water flow entering the reservoir may be determined according to the power consumed by a main pump. Such flow may be modeled as equation (9).

$$Q_s[k] = \eta_s \frac{\Delta T}{\rho.g.h_s} P_{water,s}[k] = \gamma_s P_{water,s}[k] \quad (9)$$

Further, the water flow pumped by the main pump may be defined in MPC format as shown in equation (10).

$$q_s[k, n_p] = \underbrace{\begin{bmatrix} \gamma_s & 0 & \cdots & 0 \\ 0 & \gamma_s & & 0 \\ \vdots & \vdots & \ddots & \vdots \\ 0 & 0 & \cdots & \gamma_s \end{bmatrix}}_{} \times \underbrace{\begin{bmatrix} P_{water,s}[k] \\ P_{water,s}[k+1] \\ \vdots \\ P_{water,s}[k+n_p-2] \end{bmatrix}}_{P_{water,s}[k,n_p]} \quad (10)$$

By combining equations (6), (8), and (10), the final form of the water reservoir may be obtain as equation (11).

$$m[k, n_p] = A_m m[k] + \underbrace{\begin{bmatrix} 1 & 0 & \cdots & 0 \\ 1 & 1 & \cdots & 0 \\ \vdots & \vdots & \ddots & \vdots \\ 1 & 1 & \cdots & 1 \end{bmatrix} \begin{bmatrix} \gamma_s & 0 & \cdots & 0 \\ 0 & \gamma_s & \cdots & 0 \\ \vdots & \vdots & \ddots & \vdots \\ 0 & 0 & \cdots & \gamma_s \end{bmatrix}}_{B_{water,s}} P_{water,s}[k, n_p] - \quad (11)$$

$$\underbrace{\begin{bmatrix} 1 & 0 & \cdots & 0 \\ 1 & 1 & \cdots & 0 \\ \vdots & \vdots & \ddots & \vdots \\ 1 & 1 & \cdots & 1 \end{bmatrix} \begin{bmatrix} \Delta & 0 & \cdots & 0 \\ 0 & \Delta & \cdots & 0 \\ \vdots & \vdots & \ddots & \vdots \\ 0 & 0 & \cdots & \Delta \end{bmatrix}}_{B_{water}} P_{water}[k, n_p] \, m[k, n_p] =$$

$$A_m m[k] + B_{water,s} P_{water,s}[k, n_p] - B_{water} P_{water}[k, n_p]$$

According to certain embodiments, the reservoir and pumps may include certain constraints. In some embodiments, the constraints may be described as equation (12).

$$m^{min} \cdot 1_{(n_p-1) \times 1} \leq m[k,n_p] \leq m^{max} \cdot 1_{(n_p-1) \times 1}$$

$$0_{x(n_p-1) \times 1} \leq P_{water}[k,n_p] \leq P_{water}^{max} \cdot 1_{x(n_p-1) \times 1}$$

$$0_{x(n_p-1) \times 1} \leq P_{water,s}[k,n_p] \leq P_{water,s}^{max} \cdot 1_{x(n_p-1) \times 1} \quad (12)$$

In equation (12), $m^{min}$ and $m^{max}$ represent the minimum and maximum acceptable amount of water in the reservoir. In certain embodiments, it may be assumed that all local pumps have the same electrical characteristics with a maximum power of $P_{water}^{max}$. Further, the maximum power of the main pump may be denoted by $P_{water,s}^{max}$, and matrices $1_{n\times 1}$ and $0_{n\times 1}$ may be defined as $$1_{nx1} = \underbrace{[1 \ \ldots \ 1]^T}_{n \text{ times}} \text{ and } 0_{nx1} = \underbrace{[0 \ \ldots \ 0]^T}_{n \text{ times}}$$

Energy Storage System

According to certain embodiments, the network of greenhouses may be assumed to include an energy storage system (ESS) (e.g., electrical batteries) that is in charge of supporting the microgrid in fulfilling the total electrical load, and supporting the local power quality and stability of the network. In some embodiments, the time-varying dynamics of the ESS may be given by equation (13).

$$SOC[k+1] = SOC[k] + (\beta_{ch} P_{ch}[k] - \beta_{dch} P_{dch}[k]) \Delta T \quad (13)$$

In equation (13), SOC is the state of charge of ESS. Further, $\beta_{ch}$, $\beta_{dch}$, $P_{ch}$ and $P_{dch}$ represent a charging coefficient, discharging coefficient, charging power, and discharging power, respectively. The dynamics state of the ESS may be expressed in MPC format as equations (14) and (15).

$$\underbrace{\begin{bmatrix} SOC[k+1] \\ SOC[k+2] \\ \vdots \\ SOC[k+n_p-1] \end{bmatrix}}_{SOC[k,n_p]} = \underbrace{\begin{bmatrix} 1 \\ 1 \\ \vdots \\ 1 \end{bmatrix}}_{A_b} SOC[k] + \quad (14)$$

$$+\Delta T \underbrace{\begin{bmatrix} \beta_{ch} & 0 & \cdots & 0 \\ \beta_{ch} & \beta_{ch} & \cdots & 0 \\ \vdots & \vdots & \ddots & \vdots \\ \beta_{ch} & \beta_{ch} & \cdots & \beta_{ch} \end{bmatrix}}_{\Lambda_{ch}} \underbrace{\begin{bmatrix} P_{ch}[k] \\ P_{ch}[k+1] \\ \vdots \\ P_{ch}[k+n_p-2] \end{bmatrix}}_{P_{ch}[k,n_p]} - \Lambda_{dch} P_{dch}[k, n_p] \Rightarrow \quad (15)$$

$$SOC[k, n_p] = A_b SOC[k] + \Lambda_{ch} P_{dch}[k, n_p] - \Lambda_{dch} P_{dch}[k, n_p]$$

According to certain embodiments, constraints of ESS may be described according to equation (16).

$$\forall k: SOC^{BackUp} \leq SOC[k,n_p] \leq SOC^{max}$$

$$0 \leq P_{ch}[k] \leq P_{ch}^{max}$$

$$0 \leq P_{dch}[k] \leq P_{dch}^{max}$$

$$P_{ch}[k] P_{dch}[k] = 0 \quad (16)$$

In equation (16), $SOC^{BackUp}$ shows the acceptable minimum of ESS state of charge, which may be greater than $SOC^{min}$. According to certain embodiments, the difference between $SOC^{min}$ and $SOC^{BackUp}$ may be used to cover the required energy of the ESS in case a blackout occurs. Additionally, in some embodiments, the last constraint in equation (16) may be used to prevent charging and discharging of ESS at the same time. In some embodiments, this constraint may be nonlinear, and if the problem is going to be solved by a linear solver, the constraint may be linearized. As such, according to certain embodiments, a new binary variable may be introduced as shown in equation (17).

$$P_{ch}[k] P_{dch}[k] = 0 = \succ \left\{ \begin{array}{c} 0 \leq P_{ch}[k] \leq \beta P_{ch}^{max} \\ 0 \leq P_{dch}[[k] \leq (1-\beta) P_{dch}^{max} \\ \beta \in \{0, 1\} \end{array} \right\} = \succ \quad (17)$$

$$\left\{ \begin{array}{c} 0 \leq P_{ch}[k, n_p] \leq [\beta_1 \ \beta_2 \ \cdots \ \beta_{n_p-1}]^T P_{ch}^{max} \\ 0 \leq P_{dch}[k, n_p] \leq \Omega P_{dch}^{max} \end{array} \right\}$$

Greenhouse Model

According to certain embodiments, a smart greenhouse may be considered as a self-regulating climate for optimal crop development. Such greenhouses may allow farmers to have access to a two-way communication infrastructure to monitor the energy, water requirements, and the excess of energy production for an optimum growth atmosphere. Further, each greenhouse may include artificial lighting, a $CO_2$ generator, HVAC system, fans, local pump, and natural ventilation. According to certain embodiments, each subsystem may be modeled.

In some embodiments, light may affect the life cycle of a plant and its final productions. Thus, by controlling lighting in a greenhouse, it may be possible to increase production rates. According to certain embodiments, it may be assumed that there is a linear relationship between illumination and the power consumption, as shown in equation (18).

$$u_l^i[k] = c_i \times I_i[k] \quad (18)$$

As shown in equation (18), the lighting power consumed in each greenhouse i is denoted by $u_l^i$, and $c_l$ is a constant value depending on the type of light lamps used in the greenhouse i. Further $I_i$ is the amount of radiation provided by each lamp. In some embodiments, the amount of radiation provided by each lamp may be seen as a set-point. In MPC format, the amount radiation provided by each lamp may be expressed as equation (19).

$$\underbrace{\begin{bmatrix} u_l^i[k+1] \\ u_l^i[k+2] \\ \vdots \\ u_l^i[k+n_p-1] \end{bmatrix}}_{u_l^i[k,n_p]} = c_l \underbrace{\begin{bmatrix} I_i[k+1] \\ I_i[k+2] \\ \vdots \\ I_i[k+n_p-1] \end{bmatrix}}_{I_i[k,n_p]} \Rightarrow u_l^i[k,n_p] = c_l I_i[k,n_p] \quad (19)$$

According to certain embodiments, $CO_2$ may be regulated and controlled throughout different phases of plant growth. In some embodiments, the $CO_2$ concentration may be kept in a certain range at different phases of plant growth. In certain embodiments, $CO_2$ concentration may be modeled as shown in equation (20).

$$CO_2^i[k] = \quad (20)$$
$$CO_2^i[k-1] + \frac{\Delta T}{1.27 V_{gh}^i}\left[\eta A_{gh}^i P_{CO_2}^i[k] + \zeta\left(CO_2^{out}[k] - CO_2^i[k]\right) + \right.$$
$$\left. C_{res}^i A_{gh}^i\left(C_1 + C_2\theta^i[k]\right) - C_{phot}^i A_{gh}^i I_i[k]\right]$$

As shown in equation (20), $V_{gh}^i$, $\theta^i$, $A_{gh}^i$, $C_{res}^i$, and $CO_2^i$ are respectively the volume, indoor temperature, area, respiration factor, and $CO_2$ concentration of greenhouse i. While $\eta$ is power to $CO_2$ conversion ratio, $\zeta$ is efficiency of ventilation fans, $C_{phot}^i$ is the photosynthesis factor of the crops, $C_1$ is coefficients related to plant respiration, $C_2$ is coefficients related to plant respiration, and $CO_2^{out}$ is outside $CO_2$ concentration. In some embodiments, the first term of equation (20) may be related to the amount of $CO_2$ concentration in a previous time step. Further, the second and third terms in equation (20) may be related to $CO_2$ generated by a $CO_2$ generator, and due to the ventilation system which affects the $CO_2$ rate inside the greenhouse, respectively. In addition, the fourth and fifth terms in equation (20) may be related to the plant itself. For instance, the fourth term may show plants that generated $CO_2$, and the fourth term may be dependent on indoor temperature. On the other hand, the fifth term shows the consumed $CO_2$, and may depend on an amount of light absorbed by the crops. According to certain embodiments, this model may be a linearized model of a nonlinear model. By recording this model, the following may be obtained.

$$CO_2^i[k] =$$
$$\underbrace{\frac{1.27 V_{gh}^i}{1.27 V_{gh}^i + \zeta\Delta T}}_{\lambda_i} CO_2^i[k-1] + \underbrace{\frac{\eta A_{gh}^i \Delta T}{1.27 V_{gh}^i + \zeta\Delta T}}_{\varphi} P_{CO_2}^i[k] + \underbrace{\frac{\zeta\Delta T}{1.27 V_{gh}^i + \zeta\Delta T}}_{\psi}$$
$$CO_2^{out}[k] + \underbrace{\frac{C_{res}^i A_{gh}^i \Delta T}{1.27 V_{gh}^i + \zeta\Delta T}}_{\chi}(C_1 + C_2\theta^i[k]) + \underbrace{\frac{C_{phot}^i A_{gh}^i \Delta T}{1.27 V_{qh}^i + \zeta\Delta T}}_{\tau}I_i[k]CO_2^i[k] =$$

$$\lambda CO_2^i[k-1] + \underbrace{[\varphi - \tau C_2\chi]}_{B_u^{co2}}\begin{bmatrix} P_{CO_2}^i[k] \\ I_i[k] \\ \theta^i[k] \end{bmatrix} + \underbrace{[\tau C_1\chi]}_{B_v^{co2}}\underbrace{\begin{bmatrix} CO_2^{out}[k] \\ 1 \end{bmatrix}}_{v_{co2}}$$

In certain embodiments, the above model equation may be rewritten considering the MPC format, as shown in the following equation (21).

$$\underbrace{\begin{bmatrix} CO_2^i[k+1] \\ CO_2^i[k+2] \\ \vdots \\ CO_2^i[k+n_p-1] \end{bmatrix}}_{CO_2^i[k,n_p]} = \quad (21)$$

$$\underbrace{\begin{bmatrix} \lambda_i \\ \lambda_i^2 \\ \vdots \\ \lambda_i^{n_p-1} \end{bmatrix}}_{A_{CO_2}^i} CO_2^i[k] + \begin{bmatrix} B_u^{co2} & 0 & \cdots & 0 & 0 \\ \lambda_i B_u^{co2} & B_u^{co2} & \cdots & 0 & 0 \\ \vdots & \vdots & \ddots & \vdots & \vdots \\ \lambda_i^{n_p-2} B_u^{co2} & \lambda_i^{n_p-3} B_u^{co2} & \cdots & \lambda_i B_u^{co2} & B_u^{co2} \end{bmatrix}$$

$$\underbrace{\begin{bmatrix} U_{CO_2}^i[k+1] \\ U_{CO_2}^i[k+2] \\ \vdots \\ U_{CO_2}^i[k+n_p-1] \end{bmatrix}}_{U_{CO_2}^i[k,n_p]} + \begin{bmatrix} E & 0 & \cdots & 0 & 0 \\ \lambda_i E & E & \cdots & 0 & 0 \\ \vdots & \vdots & \ddots & \vdots & \vdots \\ \lambda_i^{n_p-2}E & \lambda_i^{n_p-3}E & \cdots & \lambda_i E & E \end{bmatrix}$$

$$\underbrace{\begin{bmatrix} V_{CO_2}^i[k+1] \\ V_{CO_2}^i[k+2] \\ \vdots \\ V_{CO_2}^i[k+n_p-1] \end{bmatrix}}_{V_{CO_2}^i[k,n_p]} CO_2^i[k,n_p] =$$

$$A_{CO_2}^i CO_2^i[k,n_p] + B_{CO_2}^i U_{CO_2}^i[k,n_p] + E_{CO_2}^i V_{CO_2}^i[k,n_p]$$

As shown in equation (21), $U_{CO_2}^i[k, n_p]$ and $V_{CO_2}^i[k, n_p]$ are $[u_{CO_2}[k+1]\ u_{CO_2}[k+2]\ \ldots\ u_{CO_2}[k+n_p-1]]^T$ and $[v_{CO_2}[k+1]\ v_{CO_2}[k+2]\ \ldots\ v_{CO_2}[k+n_p-1]]$. This amount of $CO_2$ may be maintained in a certain range that may depend on time as well, as shown in equation (22).

$$CO_2^{i,min}[k] \leq CO_2^i[k] \leq CO_2^{i,max}[k] \quad (22)$$

Equation (22) may be converted into MPC format, which produces equation (23).

$$CO_2^{i,min}[k,n_p] \leq CO_2^i[k,n_p] \leq CO_2^{i,max}[k,n_p] \quad (23)$$

Temperature

Figure 5:
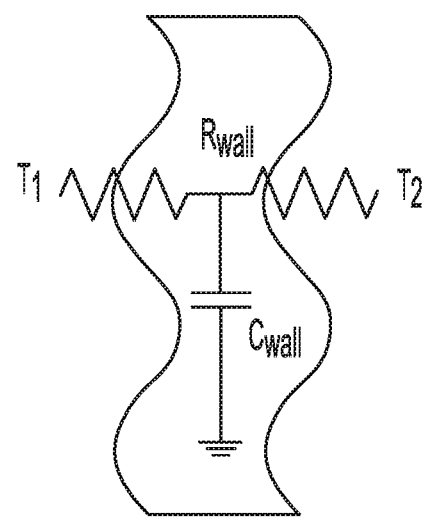
FIG. 5 illustrates an electrical model of a wall, according to certain embodiments.

FIG. 5 illustrates an electrical model of a wall, according to certain embodiments. According to certain embodiments, from the thermal characteristics viewpoint, each element in the greenhouse may have a thermal capacity and thermal resistance that are similar to electrical capacity and resistance. Thus, in some embodiments, an RC-model may be used to model the indoor temperatures of greenhouses. In this approach, the greenhouse may be modeled with resistances and capacitors. FIG. 5 illustrates one such example. For simplicity, some assumptions are assumed to avoid non-linearity of the model. One assumption may include lightening and $CO_2$ systems do not affect the inside temperatures of greenhouses. Another assumption may include that the ventilation system has a temperature compensation system, which helps to keep the temperature of ventilated air at the same level as inside temperature. This means that the ventilation system may work completely separate and independent from other parts of the system.

According to certain embodiments, the RC-model can model each element inside each greenhouse by its thermal resistance and capacitance. However, to avoid a complex model and potential dimensionality problems, each group of elements may be assumed as a single object. As such, in certain embodiments, each greenhouse and its inside components may be divided into three groups: walls, glasses, and roof materials; air; and plants and other objects.

In certain embodiments, greenhouse walls may be made of polycarbonate or poly plastic film, and may include some glass windows to absorb more sun irradiation. In some embodiments, the roof of a greenhouse may be made by the same material. According to certain embodiments, the roof material may be different from the materials of the walls and glass of the greenhouse. According to further embodiments, thermal capacitance and resistance of this group of walls, glasses, and roof materials may be found in their corresponding data-sheets. For their thermal characteristics, it may be assumed that walls, glasses, and roof are in thermal equilibrium almost all the time, and have the same temperature denoted by $\theta_3[k]$ at time step k.

According to certain embodiments, indoor air may have a thermal capacitance and a resistance. In certain embodiments, these characteristics may depend on humidity and other parameters. However, in some embodiments, they may be assumed to be constant inside a specific area. Due to operations of the HVAC and $CO_2$ generator, indoor air may be homogenous, and have the same temperature $\theta_1[k]$ at each point inside each greenhouse at time step k.

In certain embodiments, with regard to plants and other objects, since the major area of each greenhouse may be covered by crops, the thermal behaviors of these crops may be considered in the modeling. In some embodiments, each crop may have different thermal characteristics, and may have different impacts on overall consumption. According to certain embodiments, the temperature of this group at time step k may be denoted by $\theta_2[k]$.

Figure 6:
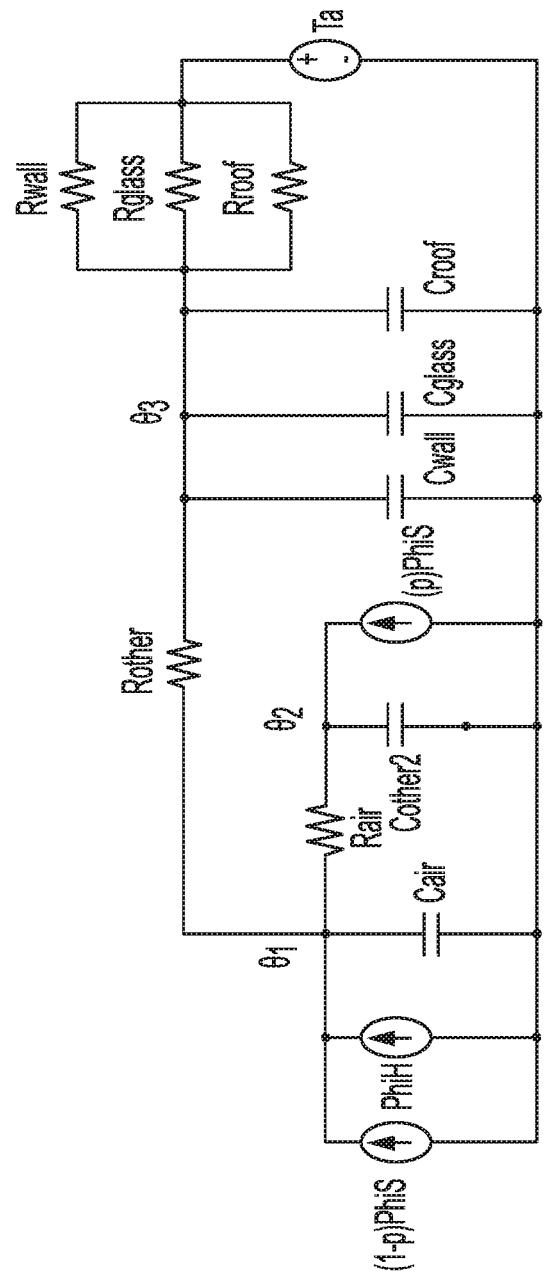
FIG. 6 illustrates an equivalent circuit of a greenhouse, according to certain embodiments.

FIG. 6 illustrates an equivalent circuit of a greenhouse, according to certain embodiments. According to certain embodiments, the equivalent circuit of each greenhouse may be obtained by a thermal equivalent circuit as illustrated in FIG. 6. Considering $x_i[k+1]$ as $[\theta_1^i[k+1] \; \theta_2^i[k+1] \; \theta_3^i[k+1]]^T$, this model may be rewritten as shown in equation (24).

$$x_i[k+1] = \underbrace{\begin{bmatrix} \frac{-1}{C_{air}R_{air}} & \frac{1}{C_{air}R_{air}} & 0 \\ \frac{1}{C_{air}R_{air}} & \frac{1}{C_{air}R_{air}} & 0 \\ \frac{1}{(C_{equ}R_{other})} & 0 & \frac{-(R_{equ}+R_{other})}{C_{equ}R_{other}R_{equ}} \end{bmatrix}}_{A^{GH_i}} x_i[k] + \underbrace{\begin{bmatrix} \frac{1}{C_{air}} \\ 0 \\ 0 \end{bmatrix}}_{B_u^{GH_i}} \underbrace{\begin{bmatrix} \phi_h[k] \\ u_{GH_i}[k] \end{bmatrix}}_{} + \underbrace{\begin{bmatrix} 0 & \frac{1-p}{C_{air}} \\ 0 & \frac{p}{C_{air}} \\ \frac{1}{C_{eq}R_{eq}} & 0 \end{bmatrix}}_{B_v^{GH_i}} \begin{bmatrix} T_a[k] \\ \phi_s[k] \\ v_{GH}[k] \end{bmatrix}$$ (24)

In equation (24), $R_{roof}$, $R_{glass}$, $R_{wall}$, $R_{other}$, and $R_{air}$ are thermal resistance respectively to the roof, glass, walls, other elements inside the green house (e.g., crops, equipment, tools, and other devices), and inside air. Further, $C_{roof}$, $C_{glass}$, $C_{wall}$, $C_{other}$, and $C_{air}$ are the heat capacitance respectively of the roof, glasses, walls, other, and inside air. Additionally, $\phi_s$ represents solar power, $\phi_h$ represents heater power, $T_a$ represents outside temperature, $\theta_1^i$ is temperature of inside air, $\theta_2^i$ is temperature of other, $\theta_3^i$ is temperature of walls, glasses and roof, and p is a portion of sun radiation absorbed by other. Further, $u_{GH}$ and $v_{GH}$ are respectively the control and disturbance inputs, while x is the state matrix. The output of the above linear system may be defined as equation (25).

$$y_i[k] = \underbrace{\begin{bmatrix} 1 & 0 & 0 \\ 0 & 1 & 0 \\ 0 & 0 & 0 \end{bmatrix}}_{c} x_i[k]$$ (25)

The complete model may be given by equation (26).

$$\begin{cases} x_i[k+1] = A^{GH_i} x_i[k] + B_u^{GH_i} u_{GH_i}[k] + B_v^{GH_i} v_{GH_i}[k] \\ y_i[k] = C x_i[k] \end{cases}$$ (26)

According to certain embodiments, in order to implement the mentioned model in the MPC optimization problem, by definition, it may be rewritten as equation (27).

$$\underbrace{\begin{bmatrix} x_i[k+1] \\ x_i[k+2] \\ \vdots \\ x_i[k+n_p-1] \end{bmatrix}}_{X_i[k,n_p]} = \underbrace{\begin{bmatrix} A^{GH_i} \\ (A^{GH_i})^2 \\ \vdots \\ (A^{GH_i})^{n_p-1} \end{bmatrix}}_{A^{GH_i}} x_i[k] +$$ (27)

$$\underbrace{\begin{bmatrix} B_u^{GH_i} & 0 & \cdots & 0 \\ A^{GH_i} B_u^{GH_i} & B_u^{GH_i} & \cdots & 0 \\ \vdots & \vdots & \ddots & \vdots \\ (A^{GH_i})^{n_p-2} B_u^{GH_i} & (A^{GH_i})^{n_p-3} B_u^{GH_i} & \cdots & B_u^{GH_i} \end{bmatrix}}_{B_{u,GH}^i}$$

$$\underbrace{\begin{bmatrix} u_{GH_i}[k+1] \\ u_{GH_i}[k+2] \\ \vdots \\ u_{GH_i}[k+n_p-1] \end{bmatrix}}_{U_{GH}^i[k,n_p]} + \underbrace{\begin{bmatrix} B_v^{GH_i} & 0 & \cdots & 0 \\ A^{GH_i} B_v^{GH_i} & B_v^{GH_i} & \cdots & 0 \\ \vdots & \vdots & \ddots & \vdots \\ (A^{GH_i})^{n_p-2} B_v^{GH_i} & (A^{GH_i})^{n_p-3} B_v^{GH_i} & \cdots & B_v^{GH_i} \end{bmatrix}}_{B_{v,GH}^i}$$

$$\underbrace{\begin{bmatrix} V_{GH_i}[k+1] \\ V_{GH_i}[k+2] \\ \vdots \\ V_{GH}[k+n_p-1] \end{bmatrix}}_{V_{GH}[k,n_p]} X_i[k, n_p] =$$

$$A_{GH}^i x_i[k] + B_{u,GH}^i U_{GH}^i[k, n_p] + B_{v,GH}^i V_{GH}[k, n_p]$$

According to certain embodiments, outputs may be represented by equation (28).

$$\begin{bmatrix} y_i[k+1] \\ y_i[k+1] \\ \cdot \\ \cdot \\ [k+n_p+1] \end{bmatrix} = \underbrace{[C \ \dots \ C]}_{C} X_i[k, n_p] Y_{GH}^i[k, n_p] = \qquad (28)$$

$$Y_{GH}^i[k,n_p]$$

$$CA_{GH}^i x_i[k] + CB_{u,GH}^i U_{GH}^i[k, n_P] + CB_{v,GH}^i V^i{}_{GH}[k, n_P]$$

According to certain embodiments, it may be assumed that each greenhouse includes an HVAC, which may be in charge of both heating or cooling. By this assumption, there may be a constraint on the maximum consumption power of $U_{GH}{}^i$ [k,$n_p$], as shown in equation (29).

$$\forall k: -u^{max,cool} \leq u[k] \leq u^{max,heat} \Rightarrow -u^{max,cool} \leq U_{GH}^i[k,n_p] \leq u^{max,heat} \qquad (29)$$

Power Balance

Certain embodiments may provide a network of greenhouses that include renewable generators, which can be connected to a main electric grid allowing energy exchanges in both cases of excess or shortage in local energy production. According to certain embodiments, by defining $P_{p,g}$ and $P_{s,g}$ as purchased and sold power from/to the grid, the power balance can be written as shown in equation (30).

$$-P_{p,g}[k] + P_{s,g}[k] + P_{ch}[k] - P_{dch}[k] + P_{water,s}[k] + \qquad (30)$$
$$\sum_{i \in \kappa} \left( u_{GH}^i[k] + u_{CO_2}^i[k] + u_I^i[k] + P_{water}^i[k] \right) - P_{wind}[k] - P_{pv}[k] = 0$$

Optimization Problem Modeling
Constraints

Certain embodiments may provide an ability to monitor and optimally control the indoor micro-climate variables to maximize crop production, while minimizing water and energy uses. In doing so, certain embodiments may define certain constrains as shown in equation (31).

$$\forall k: \begin{cases} Q^i[k] = Q_{desired}^i[k] & I^i[k] = I_{desired}^i[k] \\ CO2^i[k] = CO2_{desired}^i[k] & y^i[k] = y_{desired}^i[k] \end{cases} \qquad (31)$$

In certain embodiments, during the different stages of crops development, the control variables may affect the crops growth in a different manner, and with different priorities. As such, in certain embodiments, these constraints may be re-written as shown in equation (32).

$$Q_{desired}^i[k] - \rho_Q^i \leq Q^i[k] \leq Q_{desired}^i[k] + \rho_Q^i$$

$$I_{desired}^i[k] - \rho_L^i \leq G^i[k] \leq G_{desired}^i[k] + \rho_L^i$$

$$CO2_{desired}^i[k] - \rho_C^i \leq CO2^i[k] \leq CO2_{desired}^i[k] + \rho_C^i$$

$$y_{desired}^i[k] - \rho_y^i \leq y^i[k] \leq y_{desired}^i[k] + \rho_y^i \qquad (32)$$

Objective Function

According to certain embodiments, one objective function may relate to controlling indoor micro-climate variables. This may be performed to regulate the environment variables to create optimal conditions for crops development in all greenhouses. In other words, according to certain embodiments, it may be possible to track various reference signals defining the optimal growth of each crop available in a specific greenhouse. Thus, certain embodiments make it possible to minimize the deviation from desired reference signals. This may be achieved by minimizing the term $\alpha_Q{}^i \sigma_Q{}^i + \alpha_L{}^i \sigma_L{}^i + \alpha_C{}^i \rho_C{}^i \alpha_y{}^i \rho_y{}^i$ over a prediction horizon ($\alpha_Q{}^i$, $\alpha_L{}^i$, $\alpha_C{}^i$, and $\alpha_\theta{}^i$ are some control parameters).

According to other embodiments, the objective function may relate to purchased power. In some embodiments, one of the objectives of the network of greenhouses may be to maximize the use of local renewable energy production. Consequently, the power may exchange with the main grid, and may be limited at low levels. In particular, the purchased power from the main grid ($P_{p,g}$) over some prediction horizon may be reduced.

In certain embodiments, an optimization problem may be described as shown in equation (33) where $\chi$ is the total number of greenhouses.

$$\min \sum_{k=1}^{n_p} \left( \sum_{k=1}^{\chi} \left( \alpha_Q^i \rho_Q^i[k] + \alpha_L^i \rho_L^i[k] + \alpha_C^i \rho_C^i[k] + \alpha_y^i \rho_y^i[k] \right) + (\alpha_g c_g P_{p,g}[k]) \right) \qquad (33)$$

Application Case Study

The control algorithm of certain embodiments may be applied to manage and monitor a network of four interconnected greenhouses of an integrated microgrid. In other embodiments, the network of interconnected greenhouses may be more or less than four. According to certain embodiments, the network may be composed by a microgrid. In certain embodiments, the network may be composed by a microgrid and a set of greenhouses. The microgrid may include a wind turbine, PV modules, an ESS, a water reservoir, and a main pump. Further, each greenhouse may include a local pump devoted to irrigation purposes, artificial lighting based light-emitting diode (LED) that is considered as an efficient greenhouse lighting solution in terms of maximal productivity and energy saving, $CO_2$ generator, fans, natural ventilation, HVAC, and sensors such as those previously described herein. In addition, each greenhouse may be covered by a twin wall polycarbonate that provides a thermal resistance. In addition, an advanced metering and communication infrastructure that includes multiple sensors may be available for data gathering and processing.

Simulation Setup

According to certain embodiments, the network may include a wind turbine of 30 [kW], PV plant of 1 [kW] composed by 4×250 [W] high-performance polycrystalline solar PV modules (Dimplex PV 250 [W]), batteries with a maximal capacity of 150 [kWh] with charging/discharging rate coefficient of 1, and a water reservoir of 150 [m³]. In certain embodiments, the maximum heating/cooling power capacity may be set to 6 [kW], and the maximum $CO_2$ power generator may be equal to 4.5 [kW] with a self-discharging rate of 0.89, controllable matrix model of [0.05 −0.02 0.02], and disturbance matrix model of [0.01, 0.02], while the outdoor $CO_2$ may be equal to 500+40*rand. In some embodiments, the main pump efficiency may be set to be equal to 60%, whereas, the local pumps may be identical with the same efficiency of 60%. Furthermore, according to certain embodiments, the light conversion rate may be equal to 0.05[w/lux].

In certain embodiments, the optimal reference indoor temperatures of crops development in four greenhouses may be assumed to be equal respectively to 18, 20, 22, and 16 [° C.] in a time interval of [19:00-5:00], while set to be 22, 25, 22, and 18 [° C.] in time interval [5:00-19:00]. In some embodiments, the lighting power requirements in the four greenhouses may be respectively equal to 6.875, 3.5, 4.05, and 5 [kW] from 10:00 to 5:00, and set to be 0 [kW] for the rest of the day. In certain embodiments, 0 [kW] means that the crops do not need artificial lighting or daily sunlight is sufficient. Further, the irrigation water loads of the greenhouses may be, respectively, 1.6, 1, 1.2, and 0.8 [$m^3$].

Numerical Results

Figure 7:
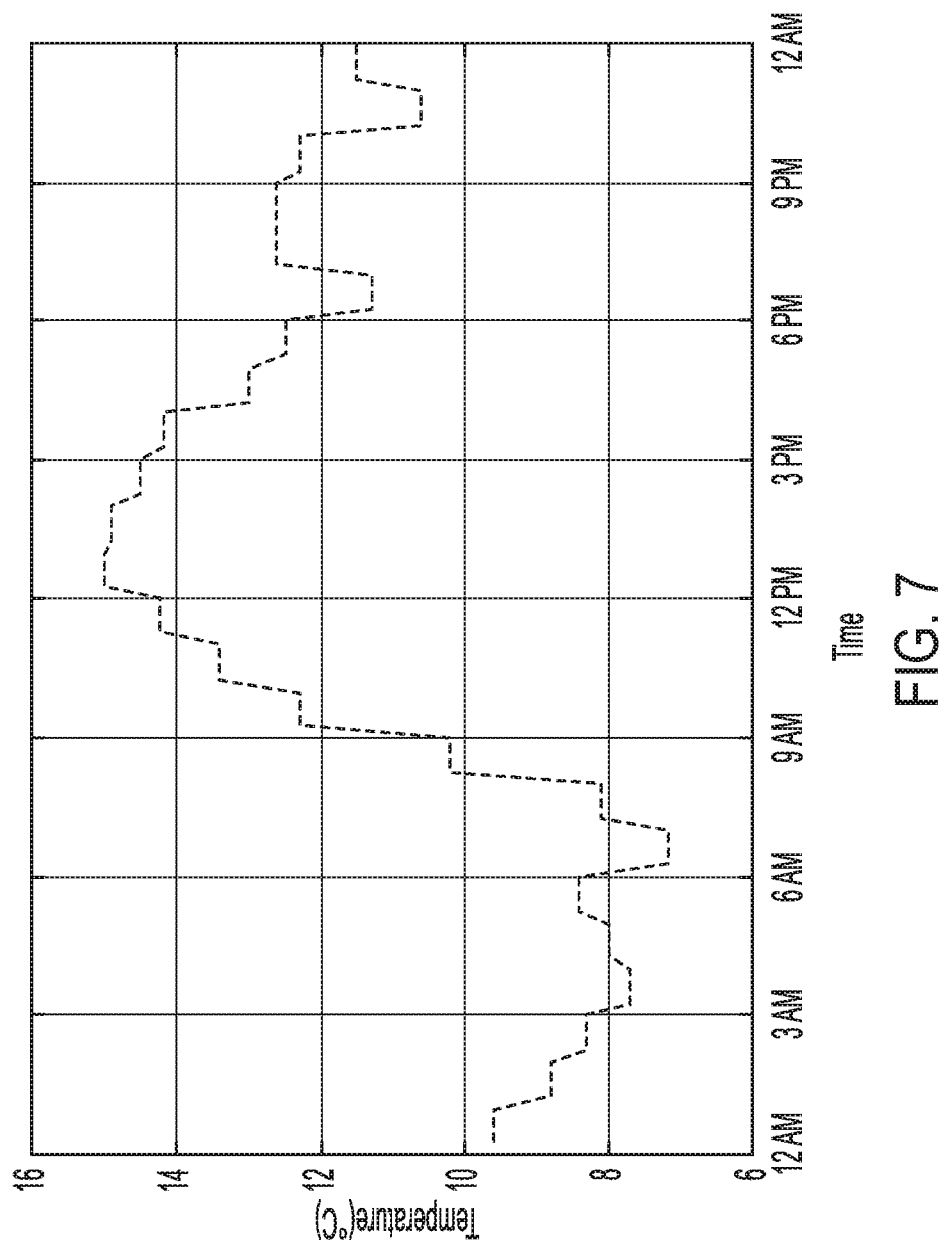
FIG. 7 illustrates a graph of temperature with respect to time, according to certain embodiments.
Figure 8:
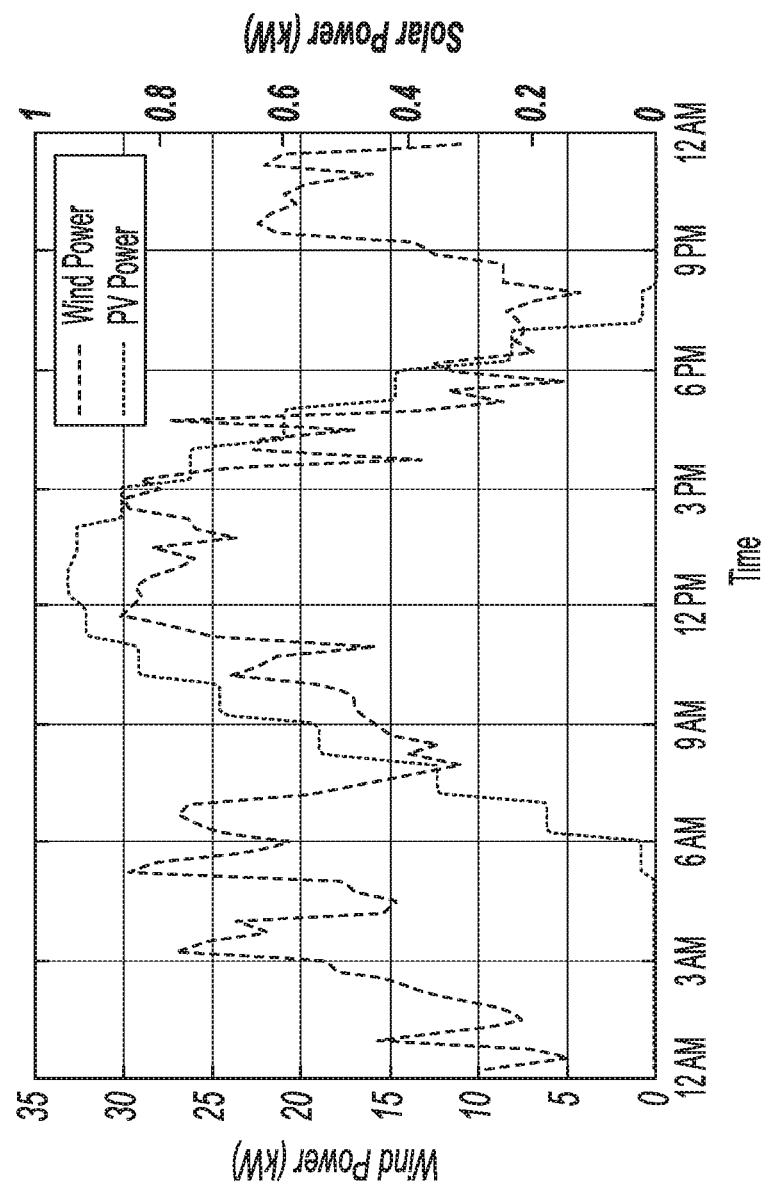
FIG. 8 illustrates a graph of wind and photo-voltaic power productions with respect to time, according to certain embodiments.

Certain embodiments may utilize a Grey-box based RC model embedded in an MPC model following a receding horizon scheme to consider the forecasting of climate data and loads. Certain embodiments may also provide a path of the future state and control variables defining the various optimal development environments in the greenhouses. The efficiency of the management and monitoring algorithm of certain embodiments may be validated via a network of four greenhouses. In doing so, it may be assumed that the outdoor temperature and the renewable power productions are illustrated respectively in FIGS. 7 and 8. In particular, FIG. 7 illustrates a graph of temperature with respect to time, according to certain embodiments. Further, FIG. 8 illustrates a graph of wind and PV power productions with respect to time, according to certain embodiments.

Figure 9:
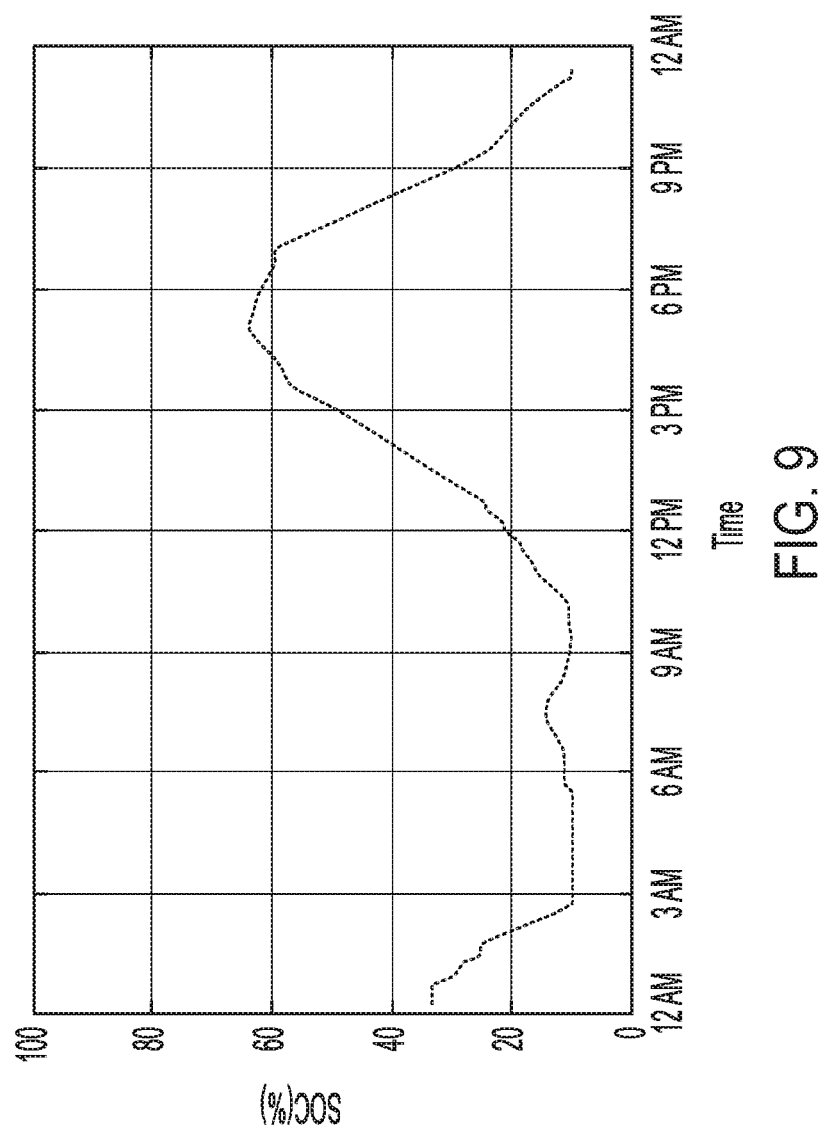
FIG. 9 illustrates a dynamic trend of a state of charge of batteries, according to certain embodiments.

In certain embodiments, it may be assumed that the batteries started operating with an initial value of 50 [kWh] representing 33% of the total capacity. The optimal dynamic trend of the SOC is reported in FIG. 9. It can be seen that the operation of batteries show three diverse behaviors according to the following time intervals, [00h3h], [9h17h], and [18h24h]. This behavior is mainly due to the stochastic character of renewable energy sources as stated in FIG. 8. Consequently, the batteries aim to improve the reliability of supply and support the microgrid in balancing the energy generation and the electric demands by maximizing the use of local renewable energy production. The batters may start responding to the power shortage by discharging energy from 33% until reaching 10% of the total capacity in the first time interval.

According to certain embodiments, while in the second time interval, the batteries may be set to be in charging mode, and the maximum charged percentage may be around 65% of the capacity. Given the high power peak load during nighttime triggered by artificial lighting, the batteries may be set in discharging mode contributing to ensuring the electric loads of the greenhouses. The previous behavior proves the aptitude of the batteries to compensate and cope with the dynamics and variations of renewable energy production and loads.

Figure 10:
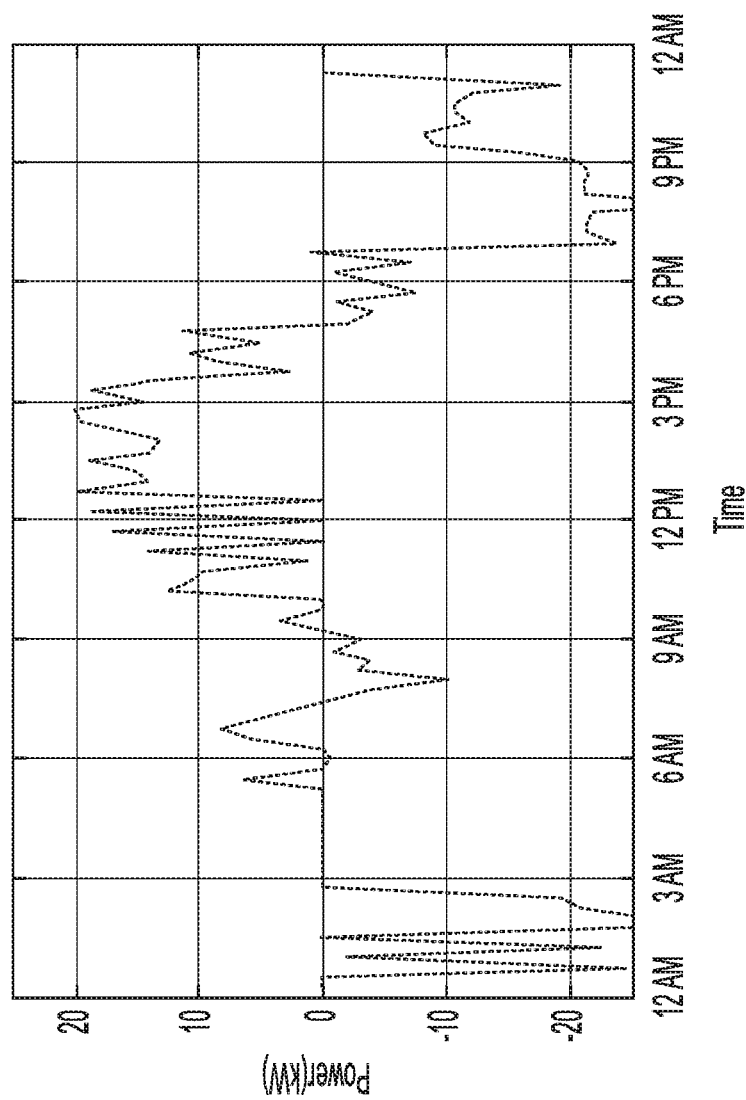
FIG. 10 illustrates charging and discharging states, according to certain embodiments.
Figure 11:
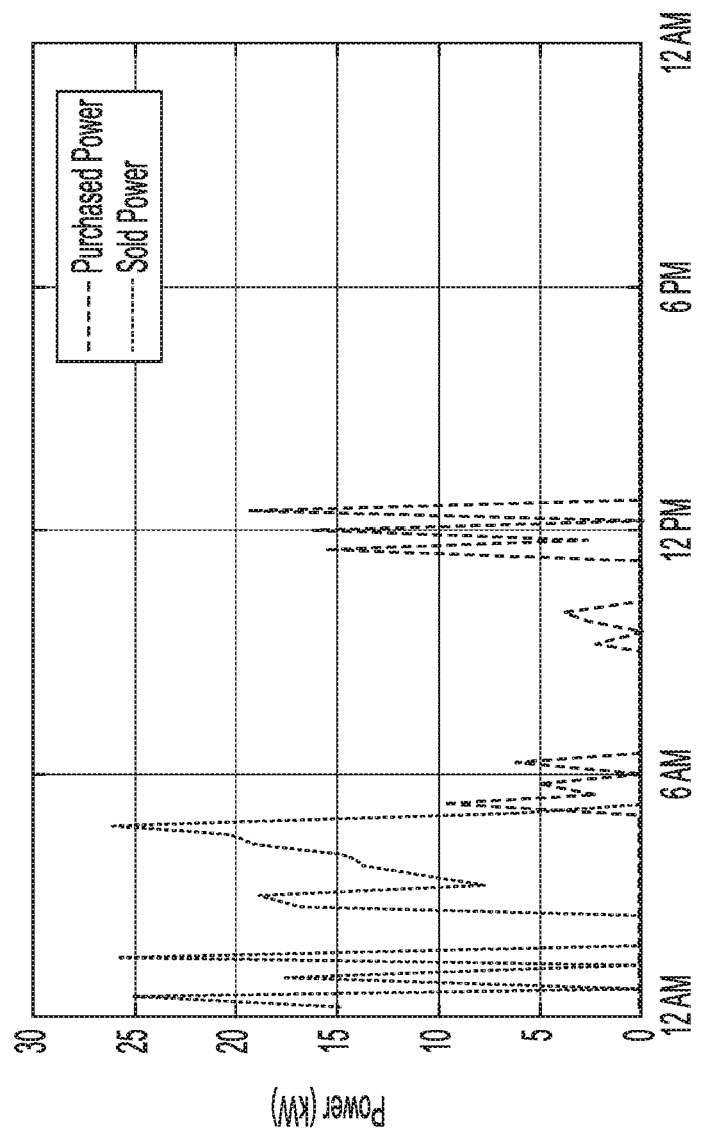
FIG. 11 illustrates power exchanges with a main grid, according to certain embodiments.

FIG. 10 illustrates charging and discharging states, according to certain embodiments. In certain embodiments, the charging/discharging modes may follow mainly the availability of the resources as well as the dynamics of the electric loads. In some embodiments, the renewable energy production usage may be maximized. For instance, it may be seen that the batteries are set in discharging mode at nighttime due to artificial lighting and absence of PV support. Whereas, during the day time, the batteries may take advantage of the absence of high power peak to store energy. According to certain embodiments, the microgrid may be allowed to exchange energy with the main electrical grid, and the purchased/sold energy is illustrated in FIG. 11. It can be seen in FIG. 11 that considerable energy is purchased from 00h to 5h supporting the microgrid in ensuring the loads. This is mainly due to both low renewable energy production (see FIG. 8), and the initial state of the batteries (33%).

Figure 12:
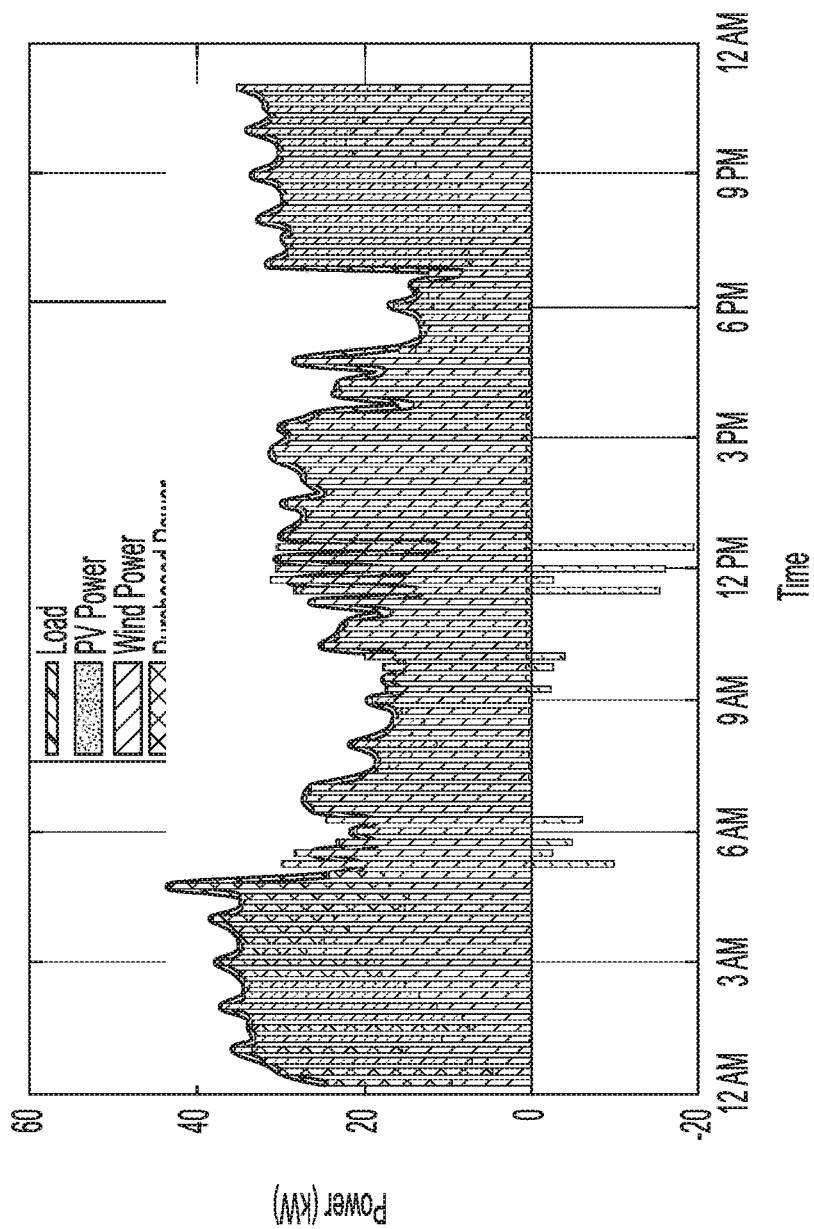
FIG. 12 illustrates the total electric load dispatch in the network, according to certain embodiments.

FIG. 12 illustrates the total electric load dispatch in the network, according to certain embodiments. In particular, FIG. 12 illustrates the time-varying total electric load dispatch in the networked greenhouses. As illustrated in FIG. 12, the total load is covered between 00h and 5h mainly by the electric grid, the wind turbine, as well as the batteries. On the other hand, the wind turbine provides the whole load during the day-time with minor contribution of the PV. From 18h to 24h, both batteries and wind turbine fulfill in collaboration, the needed load. In general, approximately 69% may be provided by the wind turbine, 1.4% may be covered by PV cells, 20% may be discharged from the batteries, and 9.6% may be purchased from the grid.

Figure 13:
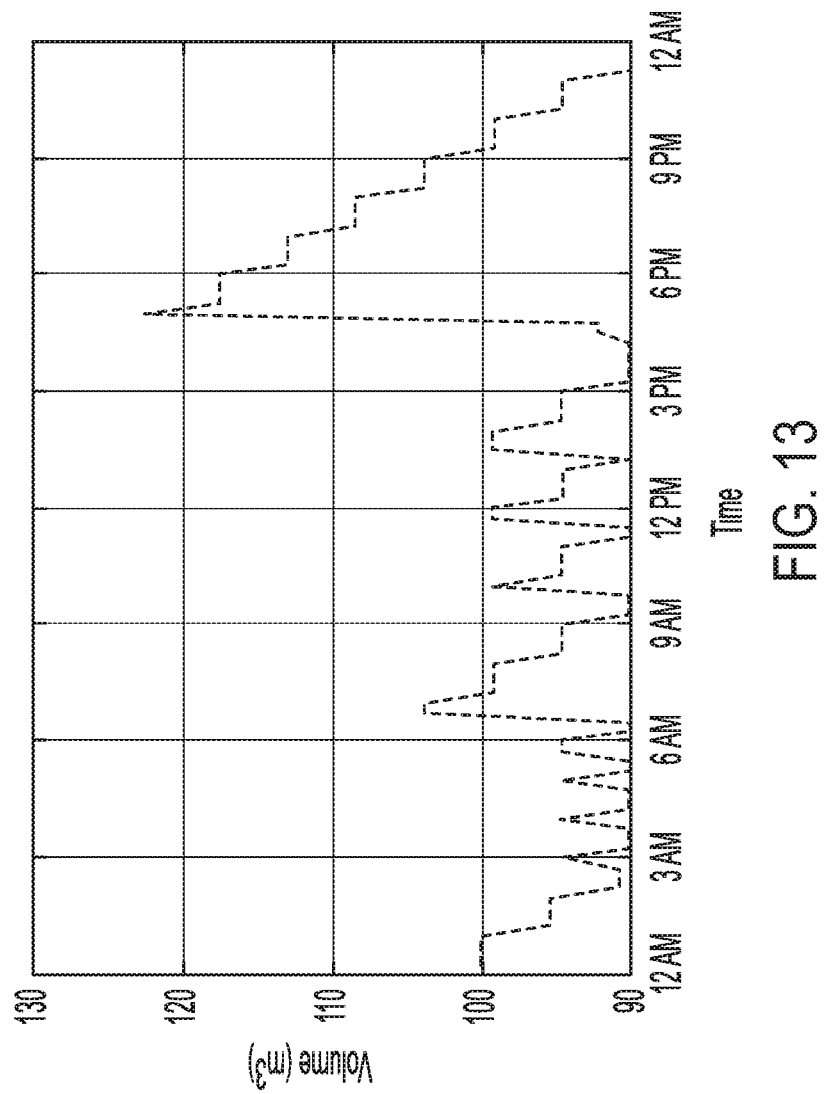
FIG. 13 illustrates time-varying dynamics of the water reservoir, according to certain embodiments.
Figure 14:
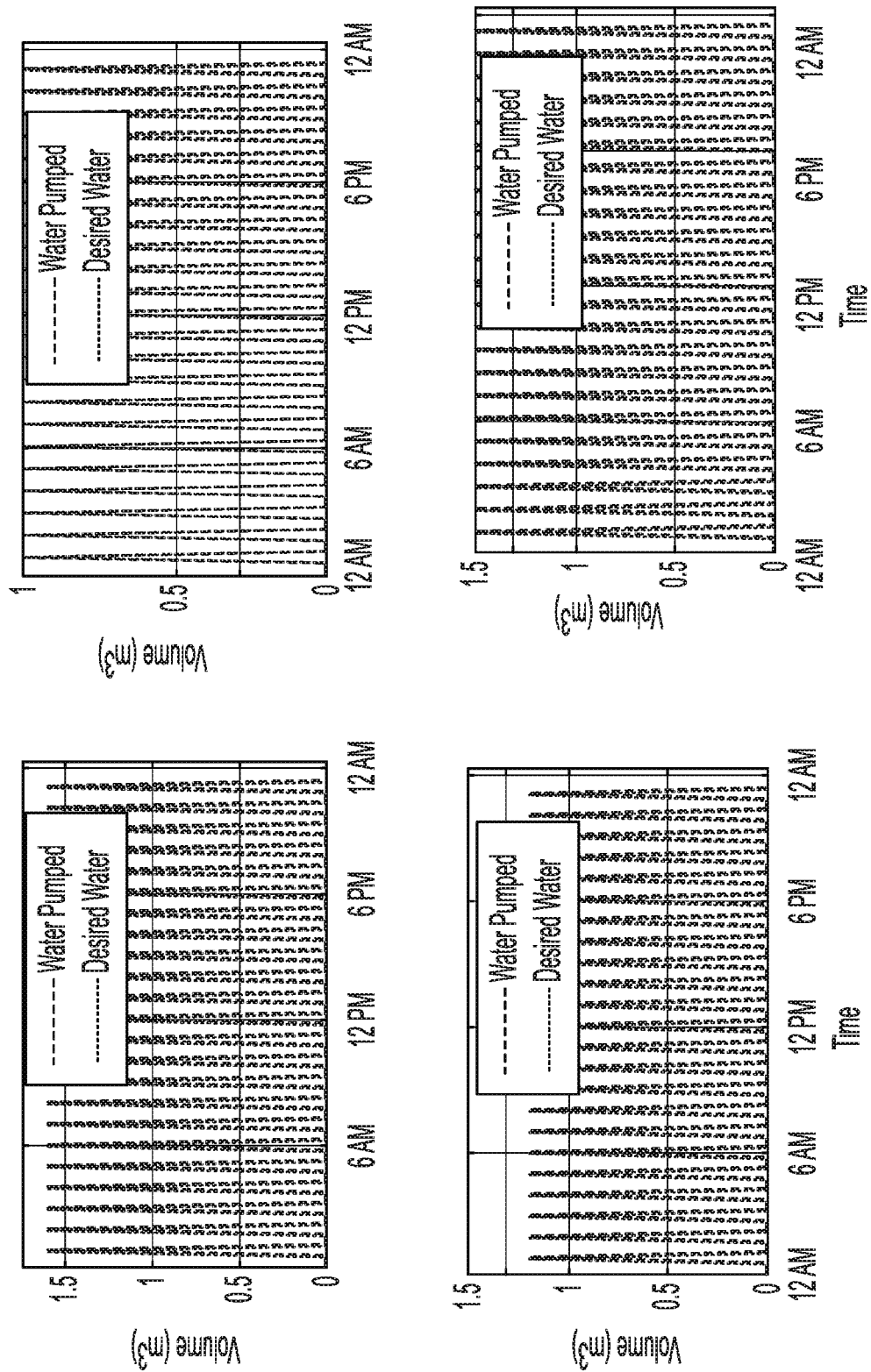
FIG. 14 illustrates a water reference flows satisfaction, according to certain embodiments.

FIG. 13 illustrates time-varying dynamics of the water reservoir, according to certain embodiments. As illustrated in FIG. 13, the starting initial state of the water reservoir is supposed to be equal to 100 [$m^3$]. With an aim of providing high quality service in terms of maximizing the water reserves, a water reservoir may be assumed with a capacity of 150 [$m^3$] and constrained by a minimum level of 90 [$m^3$]. During the nighttime, the water reservoir may be in discharging mode to satisfy the water load for irrigation purposes. This behavior may be due to the high electric power load occurring at night, and consequently, the master pump may be turned off while the local pumps are activated during 15 minutes each hour. However, in the daytime, the water reservoir may alternate between charging and discharging modes according to the energy availability. Furthermore, in some embodiments, the water reference flows defining the optimal water loads fro crops development may be ensured and satisfied. FIG. 14 illustrates a water reference flows satisfaction, according to certain embodiments. In particular, FIG. 14 illustrates a reported water satisfaction in greenhouses (1), (2), (3), and (4).

Figure 15:
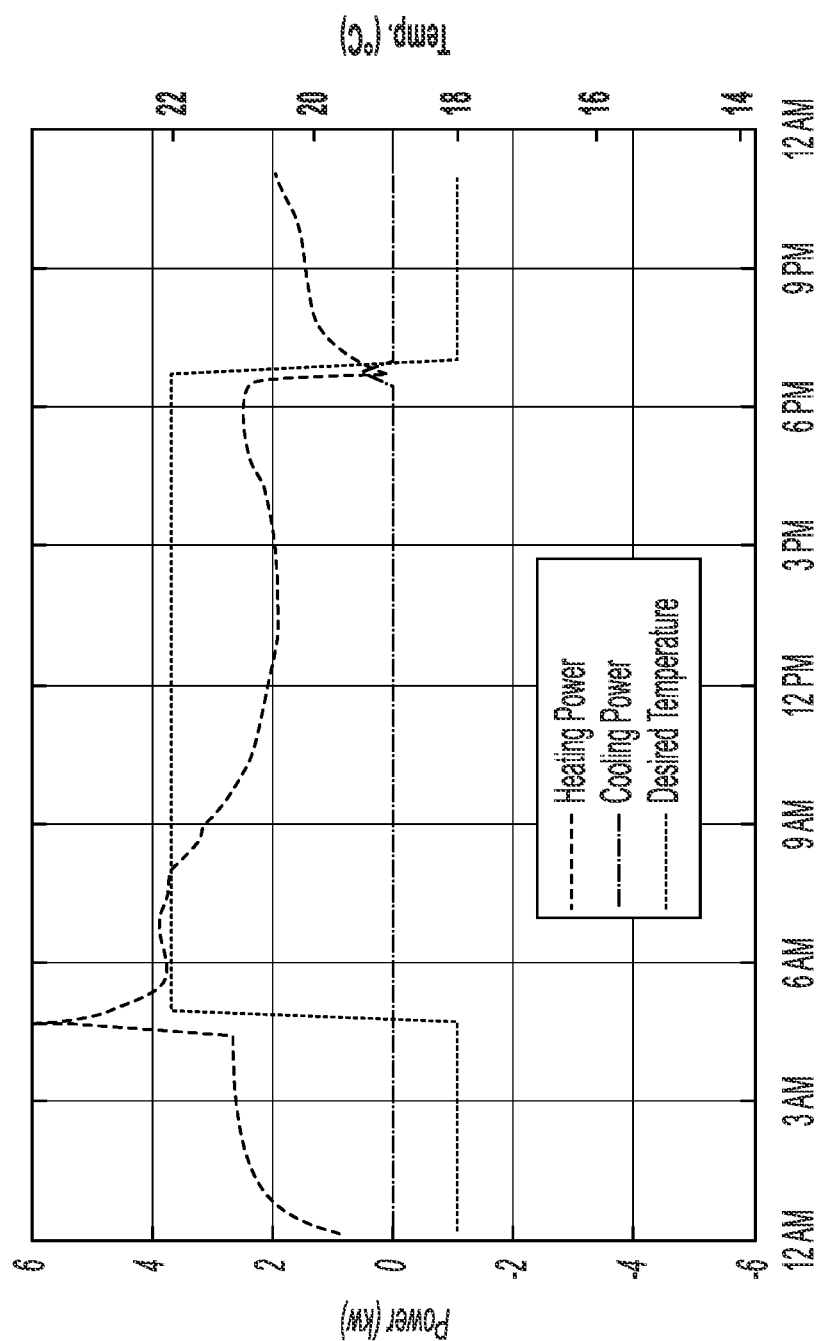
FIG. 15 illustrates an operation of a heating, ventilation, and air conditioning (HVAC) system in greenhouse (1), according to certain embodiments.
Figure 16:
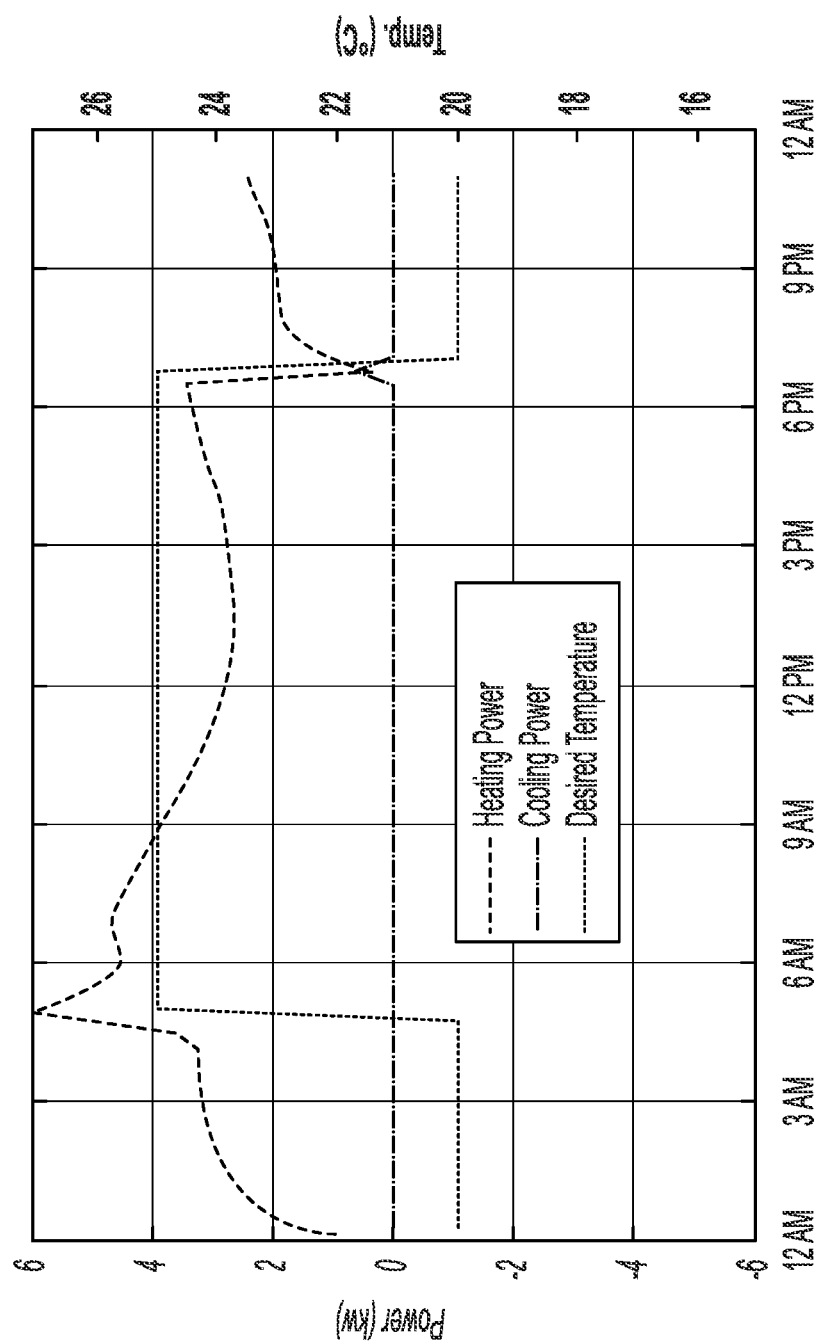
FIG. 16 illustrates an operation of an HVAC system in greenhouse (2), according to certain embodiments.
Figure 17:
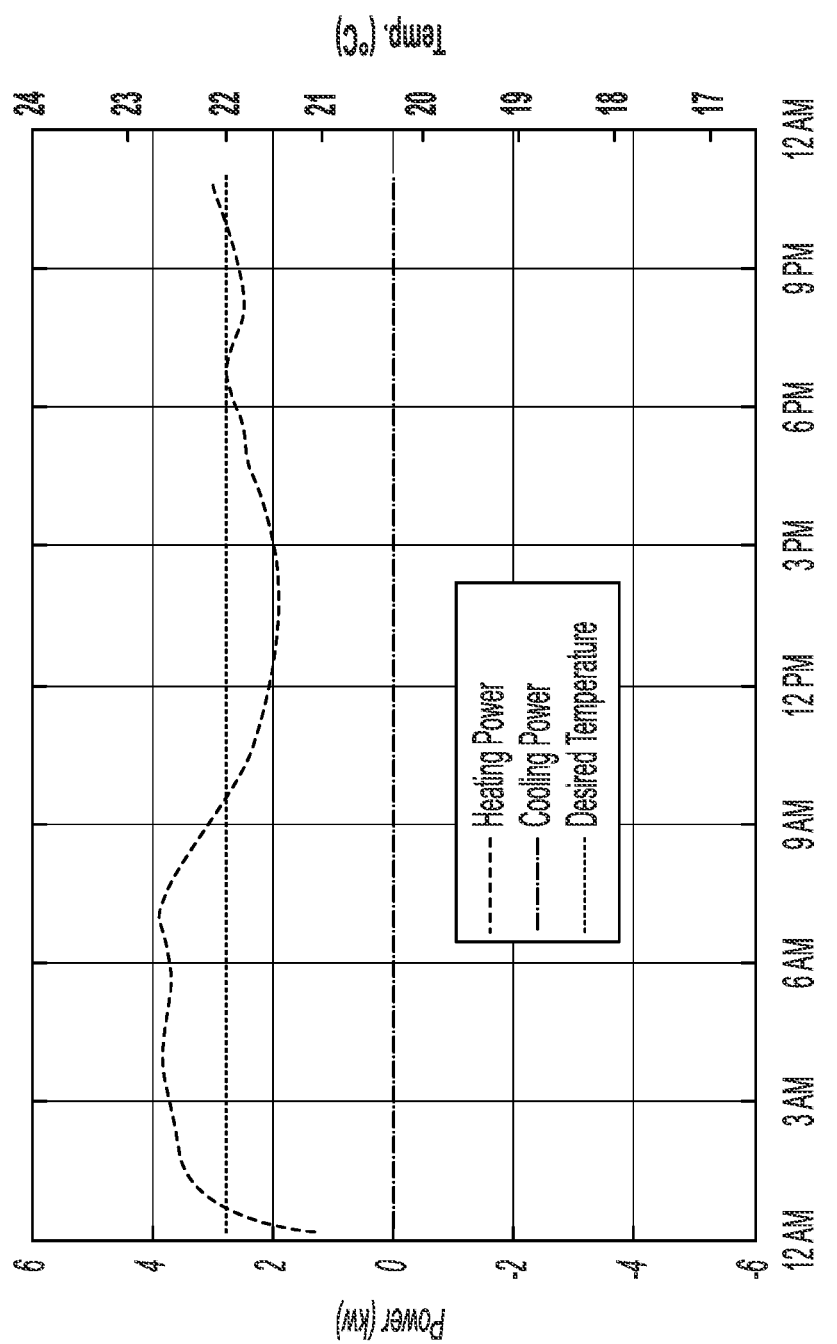
FIG. 17 illustrates an operation of an HVAC system in greenhouse (3), according to certain embodiments.
Figure 18:
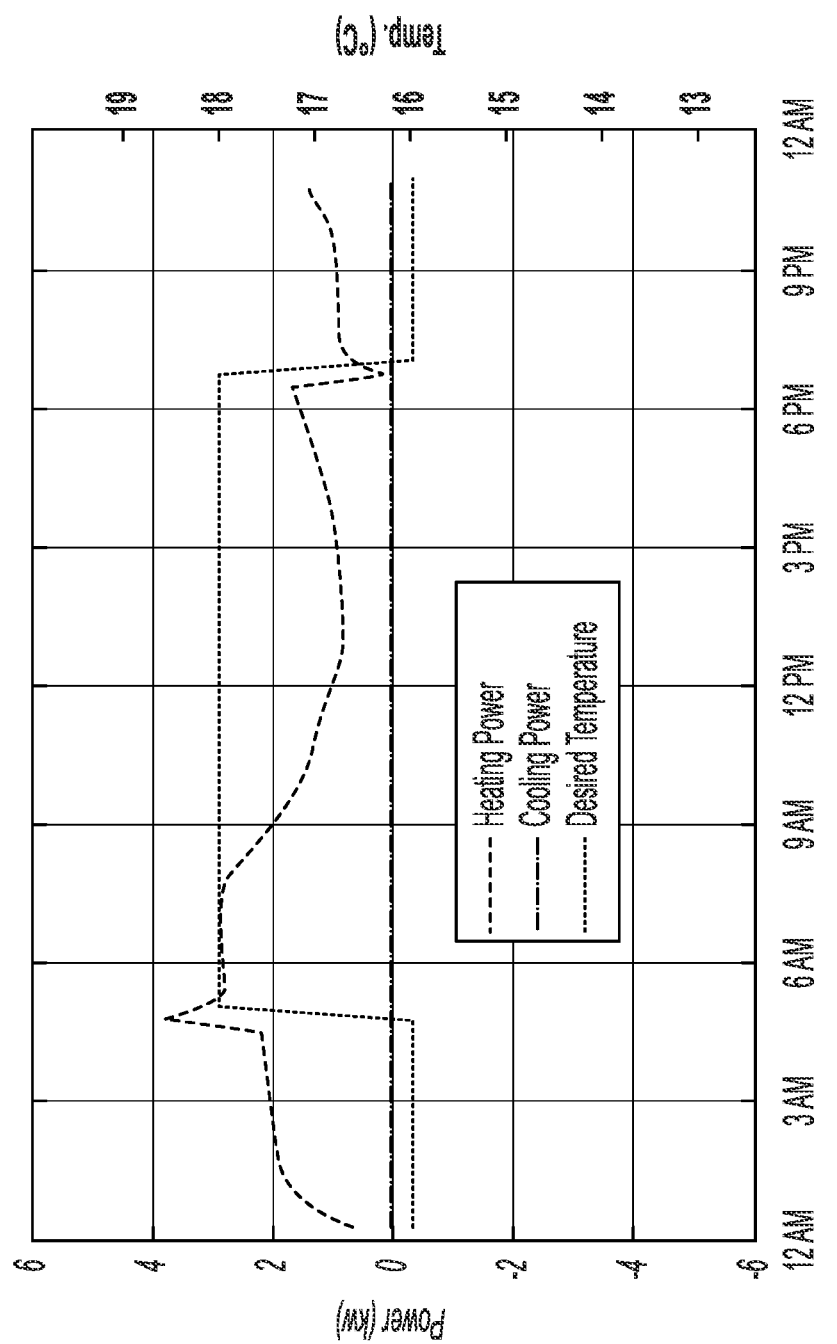
FIG. 18 illustrates an operation of an HVAC system in greenhouse (4), according to certain embodiments.

FIG. 15 illustrates an optimal operation of the HVAC system in greenhouse (1), according to certain embodiments. FIG. 16 illustrates an optimal operation of the HVAC system in greenhouse (2), according to certain embodiments. Further, FIG. 17 illustrates an optimal operation of the HVAC system in greenhouse (3), according to certain embodiments. In addition, FIG. 18 illustrates an optimal operation of the HVAC system in greenhouse (4), according to certain embodiments. These figures illustrate the optimal heating power, cooling power, and the desired temperature reference defining the optimal growth of the crops available in the greenhouses. As validated by the figures, the HVAC system of certain embodiments may operate in an optimal way to follow as close as possible, the reference temperatures. The algorithm of certain embodiments may react efficiently to regulate and adapt the operation of the HVACs to secure the optimal tracking of the desired temperature flows considering disturbance of external weather conditions, as well as thermal resistance of materials.

Figure 19:
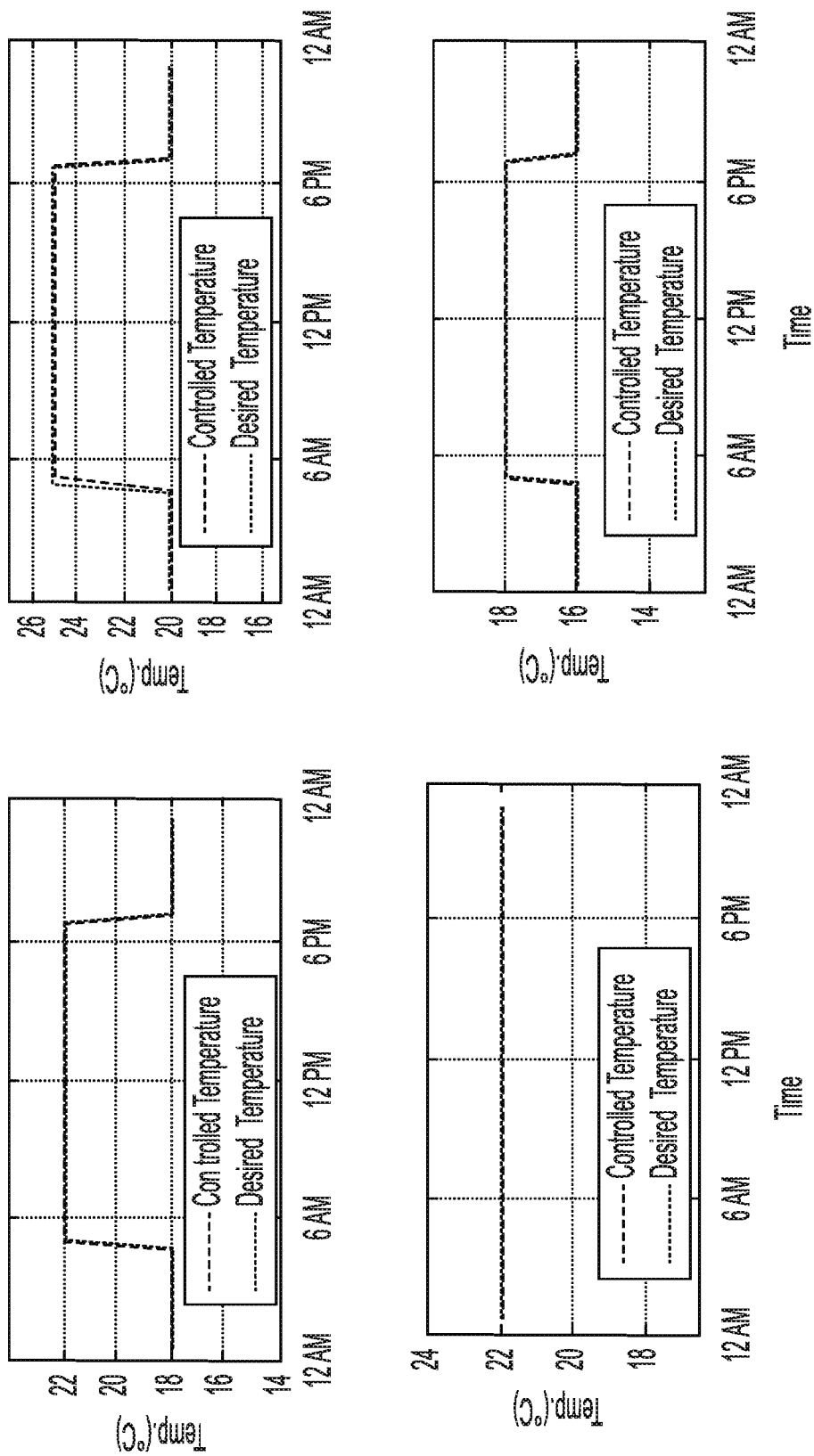
FIG. 19 illustrates a comparison between the reference signal and optimal temperature in greenhouses (1), (2), (3), and (4), according to certain embodiments.
Figure 20:
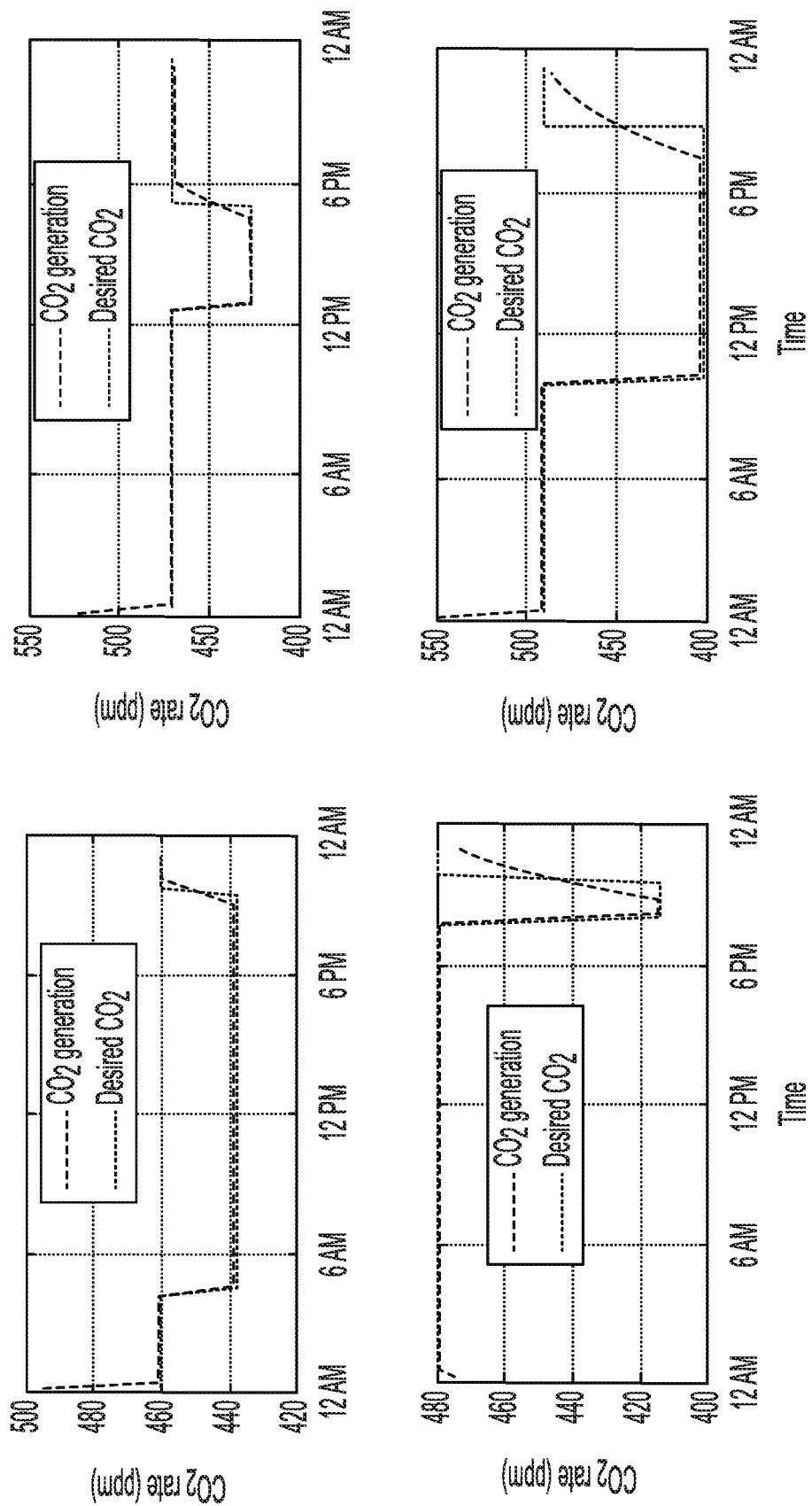
FIG. 20 illustrates $CO_2$ requirements satisfaction, according to certain embodiments.
Figure 21:
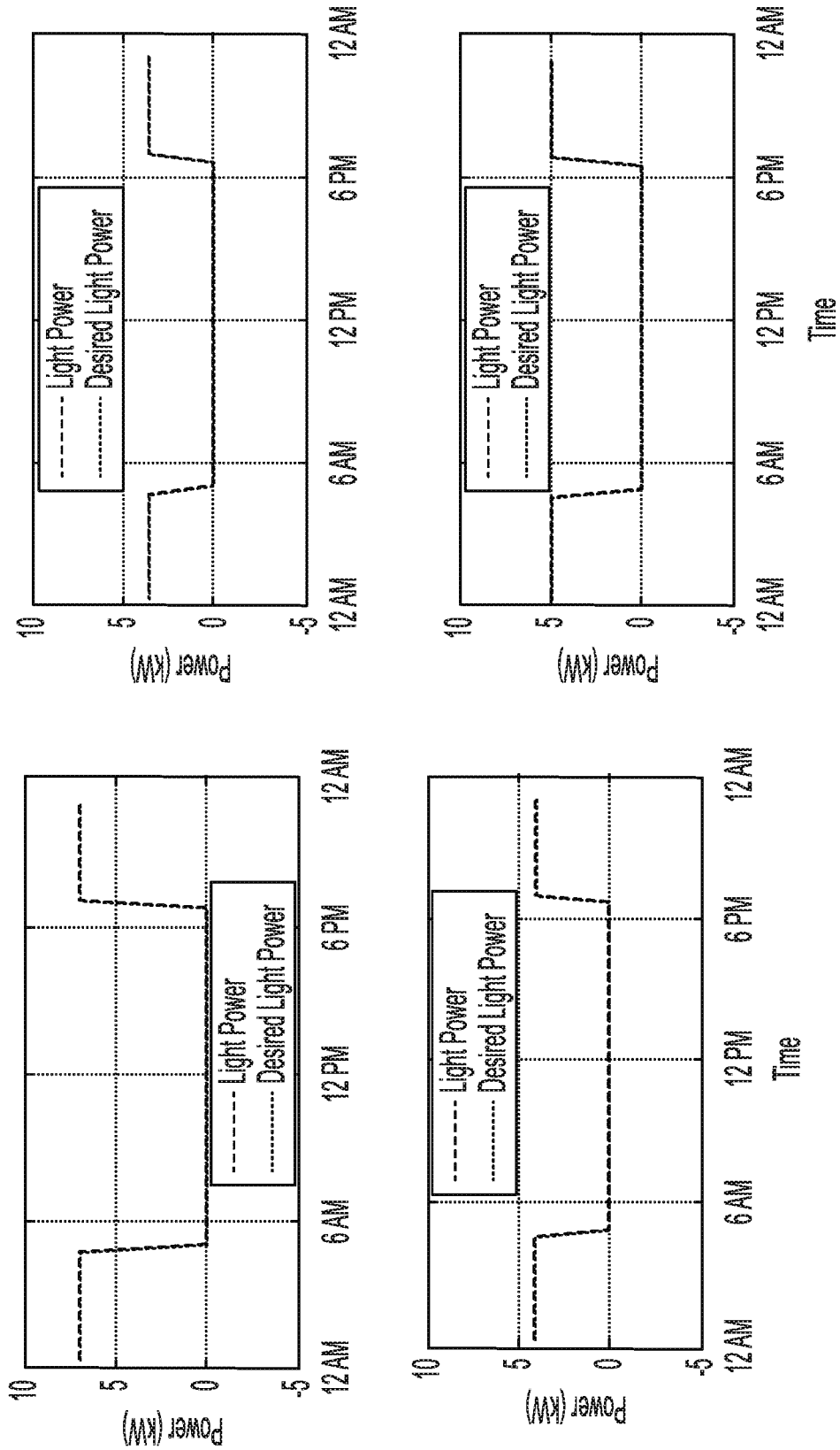
FIG. 21 illustrates artificial lighting reference versus optimal control in greenhouses (1), (2), (3), and (4), according to certain embodiments.

FIG. 19 illustrates a comparison between the reference signal and optimal temperature in greenhouses (1), (2), (3), and (4), according to certain embodiments. As illustrated in FIG. 19, the HVAC actively responds to the variation, and succeed to efficiently track the reference signal. FIG. 20 illustrates $CO_2$ requirements satisfaction, according to certain embodiments. Further, FIG. 21 illustrates the artificial lighting reference versus optimal control in greenhouses (1), (2), (3), and (4), according to certain embodiments. The figures illustrating the reference signals satisfaction demonstrate and validate the effectiveness, efficiency, and strength of the control and management algorithm in regulating the operation of the HVACs, $CO_2$ generators, and LEDs. Regulation the operation of the HVACs, $CO_2$, generators, and LEDs may satisfy and follow the desired reference signals and providing the suitable and appropriate environment for optimal crops development in the greenhouses.

Figure 22:
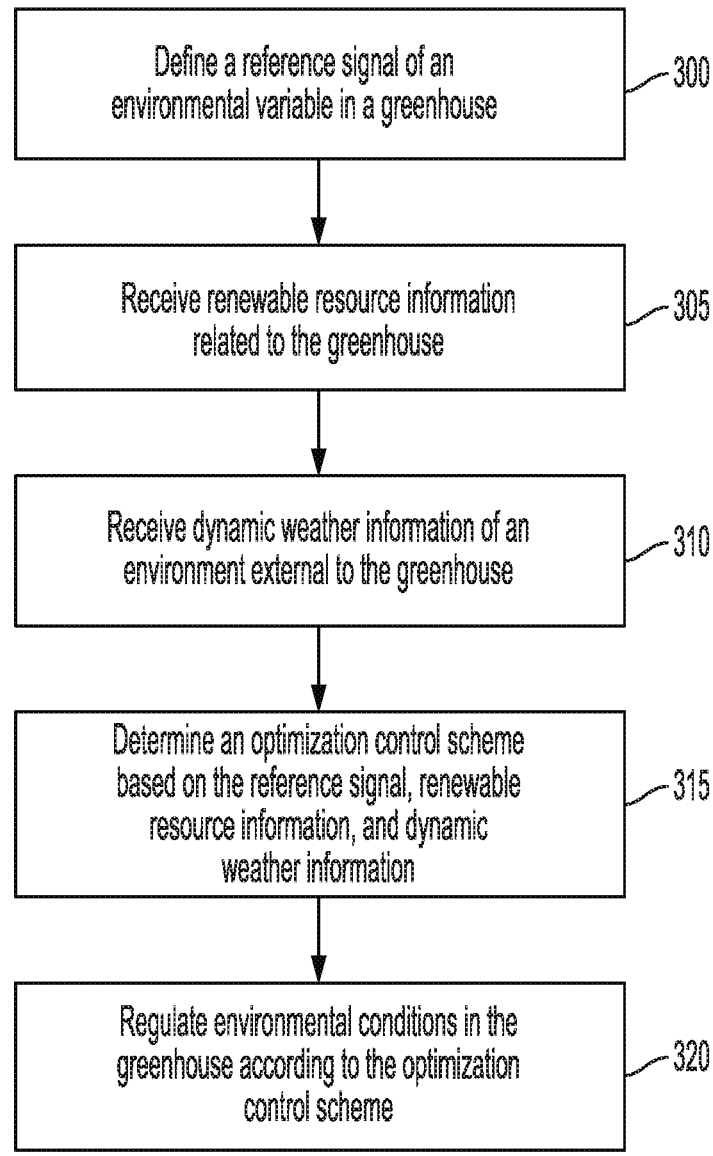
FIG. 22 illustrates a flow diagram of a method, according to certain embodiments.

FIG. 22 illustrates a flow diagram of a method, according to certain embodiments. In certain example embodiments, the flow diagram of FIG. 22 may be performed by a controller, for instance a controller for environmental systems, similar to apparatus 10 illustrated in FIG. 23. According to one example embodiment, the method of FIG. 23 may include, at 300, defining a reference signal of an environmental variable in a greenhouse. The method may also include, at 305, receiving renewable resource information related to the greenhouse. Further, at 310, the method may include receiving dynamic weather information of an environment external to the greenhouse. At 315, the method may include determining an optimization control scheme based on the reference signal, renewable resource information, and dynamic weather information. In addition, at 320, the method may include regulating environmental conditions in the greenhouse according to the optimization control scheme.

According to certain embodiments, the optimization control scheme may be a control scheme that satisfies the defined reference signal. According to other embodiments, the reference signal may define one or more optimal growth conditions for a crop in the greenhouse. According to further embodiments, the determining of the optimization control scheme may include implementing a grey box resistance-capacitance (RC) predictive model. In some embodiments, the grey box RC predictive model may include models of characteristics of the greenhouse. In other embodiments, the characteristics of the greenhouse may correspond to area, volume, wall material, wall area, shape, schematic drawing, air ventilation, and type of crops. In certain embodiments, the method may also include modeling the air ventilation and the type of crops as an RC circuit, and modeling temperature and solar radiation of the greenhouse as voltage and current in the RC circuit, respectively.

According to certain embodiments, the renewable resource information may include information on power output of a photovoltaic panel, power output of a wind turbine generator, water load information for the greenhouse from a water reservoir, and energy information from an energy storage system to support the greenhouse. According to other embodiments, the environmental variable may include at least one of lighting power, carbon dioxide concentration, or thermal characteristics. In certain embodiments, the thermal characteristics may define temperature characteristics of walls, glass, roof material, air, and crops of the greenhouse. In other embodiments, regulating environmental conditions in the greenhouse may include dynamically adjusting the lighting power, the carbon dioxide concentration, and the thermal characteristics of the greenhouse.

Figure 23:
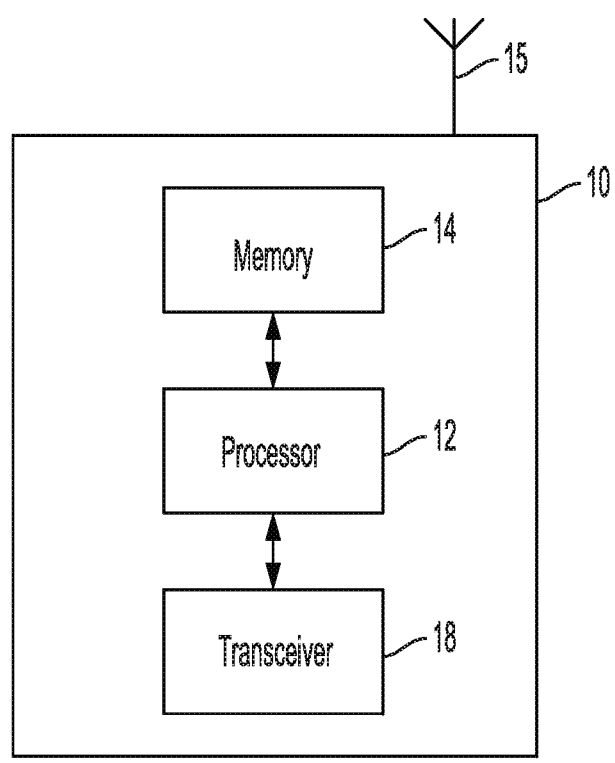
FIG. 23 illustrates an apparatus, according to certain embodiments.

FIG. 23 illustrates an apparatus according to certain embodiments. According to certain embodiments, apparatus 10 may be a controller including, for example, a controller for environmental systems. As described herein, a controller may alternatively be referred to as, for example, a computer, hardware device, mobile device, or the like.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 23.

As illustrated in the example of FIG. 23, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 23, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-22.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-22.

In some embodiments, apparatus 10 may also include or be coupled to one or more antennas 15 for receiving a signal and for transmitting from apparatus 10. Apparatus 10 may further include a transceiver 18 configured to transmit and receive information. For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with other hardware elements described herein via a wireless or wired communications link.

According to certain example embodiments, processor 12 and memory 14 may be included in or may form a part of processing circuitry or control circuitry. In addition, in some embodiments, transceiver 18 may be included in or may form a part of transceiving circuitry. As discussed above, according to certain example embodiments, apparatus 10 may be a controller for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to define a reference signal of an environmental variable in a greenhouse. Apparatus 10 may also be controlled by memory 14 and processor 12 to receive renewable resource information related to the greenhouse. Apparatus 10 may further be controlled by memory 14 and processor 12 to receive dynamic weather information of an environment external to the greenhouse. In addition, apparatus 10 may be controlled by memory 14 and processor 12 to determine an optimization control scheme based on the reference signal, renewable resource information, and dynamic weather information. Further, apparatus 10 may be controlled by memory 14 and processor 12 to regulate environmental conditions in the greenhouse according to the optimization control scheme.

Certain embodiments described herein provide several technical improvements, enhancements, and/or advantages. In some example embodiments, it may be possible to provide an advanced and comprehensive energy management algorithm capable of performing specialized monitoring and control functionalities for a network of smart greenhouses integrated microgrid. It may also be possible to integrate a Grey-box based resistance-capacitance model to obtain a comprehensive modeling and control of the network of greenhouses integrated microgrid while applying real-time features of MPC in order to handle the forecasting errors related to uncertain variables. Certain embodiments may also provide automation and control methodologies for smart management of networked greenhouses, and improve transition to smart agriculture in terms of self-management, self-optimization, as well as secure operation in a feasible way.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

We claim:

1. A method for controlling an environmental system, comprising:
   creating, at the same time, a distinct microclimate in each of a plurality of greenhouses that are networked together, wherein the distinct microclimate in each of the plurality of greenhouses is created by defining a lighting power reference signal of a lighting power, a carbon dioxide concentration reference signal of a carbon dioxide concentration, and a temperature reference signal of a temperature tailored for a specific crop in each of the plurality of greenhouses;
   receiving renewable resource information related to each of the plurality of greenhouses, wherein the renewable resource information comprises water load information for each of the plurality of greenhouses from a water reservoir;
   receiving dynamic weather information of an environment external to each of the plurality of greenhouses;
   integrating, in each of the plurality of greenhouses, the lighting power reference signal, the carbon dioxide concentration reference signal, the temperature reference signal, the renewable resource information, and the dynamic weather information into a network controller device configured to control the distinct microclimate in each of the plurality of greenhouses;
   determining, via the network controller device, an optimization control scheme for the specific crop that satisfies the lighting power reference signal, the carbon dioxide concentration signal, and the temperature reference signal while taking into account the renewable resource information and the dynamic weather information;
   dynamically regulating, via the network controller device, the lighting power, the carbon dioxide concentration, and the temperature in each of the plurality of greenhouses according to the optimization control scheme;
   dynamically controlling the water reservoir between a discharging mode and a charging mode based on time and an electric power load of the environmental system; and
   determining an amount of water flow entering the water reservoir based on power consumed by a main pump of the environmental system,
   wherein the carbon dioxide concentration is dynamically regulated according to different phases of growth of the specific crop.

2. The method for controlling the environmental system according to claim 1, wherein the optimization control scheme is a control scheme that satisfies the defined lighting power reference signal, the defined carbon dioxide concentration reference signal, and the defined temperature reference signal.

3. The method for controlling the environmental system according to claim 1, wherein the determining of the optimization control scheme comprises implementing a grey box resistance-capacitance (RC) predictive model.

4. The method for controlling the environmental system according to claim 3, wherein the grey box RC predictive model comprises models of characteristics of each of the plurality of greenhouses.

5. The method for controlling the environmental system according to claim 4, wherein the characteristics of each of the plurality of greenhouses correspond to area, volume, wall material, wall area, shape, schematic drawing, air ventilation, and type of crops.

6. The method for controlling the environmental system according to claim 5, wherein the method further comprises:
modeling air ventilation and the type of crops as an RC circuit; and
modeling temperature and solar radiation of each of the plurality of greenhouses as voltage and current in the RC circuit, respectively.

7. The method for controlling the environmental system according to claim 1, wherein the renewable resource information comprises information on:
power output of a photovoltaic panel;
power output of a wind turbine generator; and
energy information from an energy storage system to support each of the plurality of greenhouses.

8. The method for controlling the environmental system according to claim 1, wherein thermal characteristics of each of the plurality of greenhouses are based on wall types, glass types, roof material, and air of each of the plurality of greenhouses.

9. A controller for regulating environmental systems, comprising:
at least one processor; and
at least one memory including computer program code,
wherein the at least one memory and the computer program code are configured to, with the at least one processor, cause the controller at least to:
create, at the same time, a distinct microclimate in each of a plurality of greenhouses that are networked together, wherein the distinct microclimate in each of the plurality of greenhouses is created by defining a lighting power reference signal of a lighting power, a carbon dioxide concentration reference signal of a carbon dioxide concentration, and a temperature reference signal of a temperature tailored for a specific crop in a each of the plurality of greenhouses;
receive renewable resource information related to each of the plurality of greenhouses, wherein the renewable resource information comprises water load information for each of the plurality of greenhouses from a water reservoir;
receive dynamic weather information of an environment external to each of the plurality of greenhouses;
integrate, in each of the plurality of greenhouses, the lighting power reference signal, the carbon dioxide concentration reference signal, the temperature reference signal, the renewable resource information, and the dynamic weather information into the controller configured to control the distinct microclimate in each of the plurality of greenhouses;
determine an optimization control scheme for the specific crop that satisfies the lighting power reference signal, the carbon dioxide concentration signal, and the temperature reference signal while taking into account the renewable resource information and the dynamic weather information;
dynamically regulate the lighting power, the carbon dioxide concentration, and the temperature in each of the plurality of greenhouses according to the optimization control scheme;
dynamically control the water reservoir between a discharging mode and a charging mode based on time and an electric power load of the environmental systems; and
determine an amount of water flow entering the water reservoir based on power consumed by a main pump of the environmental system,
wherein the carbon dioxide concentration is dynamically regulated according to different phases of growth of the specific crop.

10. The controller according to claim 9, wherein the optimization control scheme is a control scheme that satisfies the defined lighting power reference signal, the defined carbon dioxide concentration reference signal, and the defined temperature reference signal.

11. The controller according to claim 9, wherein the determining of the optimization control scheme comprises implementing a grey box resistance-capacitance (RC) predictive model.

12. The controller according to claim 11, wherein the grey box RC predictive model comprises models of characteristics of each of the plurality of greenhouses.

13. The controller according to claim 12, wherein the characteristics of each of the plurality of greenhouses correspond to area, volume, wall material, wall area, shape, schematic drawing, air ventilation, and type of crops.

14. The controller according to claim 13, wherein the at least one memory and the computer program code are configured to, with the at least one processor, cause the controller at least to:
model air ventilation and the type of crops as an RC circuit; and
model temperature and solar radiation of each of the plurality of greenhouses as voltage and current in the RC circuit, respectively.

15. The controller according to claim 9, wherein the renewable resource information comprises information on:
power output of a photovoltaic panel;
power output of a wind turbine generator; and
energy information from an energy storage system to support each of the plurality of greenhouses.

16. The controller according to claim 9, wherein thermal characteristics of the green house are based on wall types, glass types, roof material, and air of each of the plurality of greenhouses.

17. A computer program, embodied on a non-transitory computer readable medium, the computer program, when executed by a processor, causes the processor to:
create, at the same time, a distinct microclimate in each of a plurality of greenhouses that are networked together, wherein the distinct microclimate in each of the plurality of greenhouses is created by defining a lighting reference signal of a lighting power, a carbon dioxide concentration reference signal of a carbon dioxide concentration, and a temperature reference signal of a temperature tailored for a specific crop in a each of the plurality of greenhouses;
receive renewable resource information related to each of the plurality of greenhouses, renewable resource information comprises water load information for each of the plurality of greenhouses from a water reservoir;
receive dynamic weather information of an environment external to each of the plurality of greenhouses;
integrate, in each of the plurality of greenhouses, the lighting power reference signal, the carbon dioxide concentration reference signal, the temperature reference signal, the renewable resource information, and the dynamic weather information into a network controller device configured to control the distinct microclimate in each of the plurality of greenhouses;
determine, via the network controller device, an optimization control scheme for the specific crop that satisfies the lighting power reference signal, the carbon dioxide concentration signal, and the temperature reference signal while taking into account the renewable resource information and the dynamic weather information;

dynamically regulate, via the network controller device, the lighting power, the carbon dioxide concentration, and the temperature in each of the plurality of greenhouses according to the optimization control scheme;

dynamically control the water reservoir between a discharging mode and a charging mode based on time and an electric power load of an environmental system; and determine an amount of water flow entering the water reservoir based on power consumed by a main pump of the environmental system, wherein the carbon dioxide concentration is dynamically regulated according to different phases of growth of the specific crop.

18. The computer program according to claim 17, wherein the optimization control scheme is a control scheme that satisfies the defined lighting power reference signal, the defined carbon dioxide concentration reference signal, and the defined temperature reference signal.

19. The computer program according to claim 17, wherein the determining of the optimization control scheme comprises implementing a grey box resistance-capacitance (RC) predictive model.

20. The computer program according to claim 19, wherein the grey box RC predictive model comprises models of characteristics of each of the plurality of greenhouses.

21. The computer program according to claim 20, wherein the characteristics of each of the plurality of greenhouses correspond to area, volume, wall material, wall area, shape, schematic drawing, air ventilation, and type of crops.

22. The computer program according to claim 21, wherein the processor is further caused to:

model air ventilation and the type of crops as an RC circuit; and model temperature and solar radiation of each of the plurality of greenhouses as voltage and current in the RC circuit, respectively.

23. The computer program according to claim 17, wherein the renewable resource information comprises information on:

power output of a photovoltaic panel;

power output of a wind turbine generator; and energy information from an energy storage system to support each of the plurality of greenhouses.

24. The computer program according to claim 17, wherein thermal characteristics of each of the plurality of greenhouses are based on wall types, glass types, roof material, and air of each of the plurality of greenhouses.

\* \* \* \* \*